(12) United States Patent
Murase

(10) Patent No.: US 11,523,099 B2
(45) Date of Patent: Dec. 6, 2022

(54) MEASUREMENT DEVICE

(71) Applicant: SONY SEMICONDUCTOR SOLUTIONS CORPORATION, Kanagawa (JP)

(72) Inventor: Takuro Murase, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 11 days.

(21) Appl. No.: 17/250,462

(22) PCT Filed: Jun. 19, 2019

(86) PCT No.: PCT/JP2019/024232
§ 371 (c)(1),
(2) Date: Jan. 25, 2021

(87) PCT Pub. No.: WO2020/026626
PCT Pub. Date: Feb. 6, 2020

(65) Prior Publication Data
US 2021/0203907 A1 Jul. 1, 2021

(30) Foreign Application Priority Data
Aug. 1, 2018 (JP) .............................. JP2018-144862

(51) Int. Cl.
*H04N 13/207* (2018.01)
*H04N 13/254* (2018.01)
*H04N 5/369* (2011.01)
(52) U.S. Cl.
CPC ....... *H04N 13/207* (2018.05); *H04N 5/36965* (2018.08); *H04N 13/254* (2018.05)

(58) Field of Classification Search
CPC ............. H04N 13/207; H04N 5/36965; H04N 13/254; H04N 5/37452; H04N 5/378; G01B 9/02; G01B 9/021; G01B 11/24
See application file for complete search history.

(56) References Cited

U.S. PATENT DOCUMENTS 7,023,481 B1* 4/2006 Watanabe ......... H01L 27/14825
257/E27.152
2005/0062867 A1* 3/2005 Mabuchi ................ H04N 5/374
348/E3.018
(Continued)

FOREIGN PATENT DOCUMENTS

| CN | 1297257 A | 5/2001 |
| EP | 1102324 A1 | 5/2001 |

(Continued)

OTHER PUBLICATIONS

International Search Report and Written Opinion of PCT Application No. PCT/JP2019/024232, dated Sep. 24, 2019, 09 pages of ISRWO.

*Primary Examiner* — Jared Walker
(74) *Attorney, Agent, or Firm* — Chip Law Group

(57) ABSTRACT

Provided is a measurement device that includes a pixel including a light receiver, a plurality of storage sections, and an electric charge supplying section. The light receiver generates received-light electric charge by performing photoelectric conversion on the basis of light. The plurality of storage sections stores the received-light electric charge and the plurality of storage sections includes a first storage section and a second storage section. The electric charge supplying section selectively supplies the received-light electric charge generated by the light receiver to the plurality of storage sections. The measurement device includes a processor that generates a first detection value on the basis of an electric charge amount of the received-light electric (Continued)

charge stored in the first storage section, and generates a second detection value on the basis of an electric charge amount of the received-light electric charge stored in the second storage section. The processor generates a first pixel value on the basis of a difference between the first detection value and the second detection value.

11 Claims, 16 Drawing Sheets

(56) References Cited

U.S. PATENT DOCUMENTS

| | | | | |
|---|---|---|---|---|
| 2011/0242389 A1* | 10/2011 | Takatsuka | ............ | H04N 5/3575 348/311 |
| 2012/0075499 A1* | 3/2012 | Kawaguchi | ........ | H04N 5/35581 348/E5.037 |
| 2013/0301909 A1 | 11/2013 | Sato | | |
| 2013/0329234 A1 | 12/2013 | Murakami et al. | | |
| 2016/0353045 A1* | 12/2016 | Kawahito | ......... | H01L 27/14609 |
| 2017/0127036 A1* | 5/2017 | You | ......................... | H04N 5/353 |
| 2017/0171476 A1* | 6/2017 | Katzir | .................. | G02B 26/001 |
| 2017/0223334 A1* | 8/2017 | Nobayashi | .............. | G06T 7/571 |

FOREIGN PATENT DOCUMENTS

| | | |
|---|---|---|
| EP | 2667150 A1 | 11/2013 |
| EP | 2680035 A1 | 1/2014 |
| JP | 11-194011 A | 7/1999 |
| JP | 2001-148808 A | 5/2001 |
| JP | 2003-090956 A | 3/2003 |
| TW | 503653 B | 9/2002 |
| TW | 201243373 A | 11/2012 |
| WO | 2012/099220 A1 | 7/2012 |
| WO | 2012/115083 A1 | 8/2012 |

\* cited by examiner

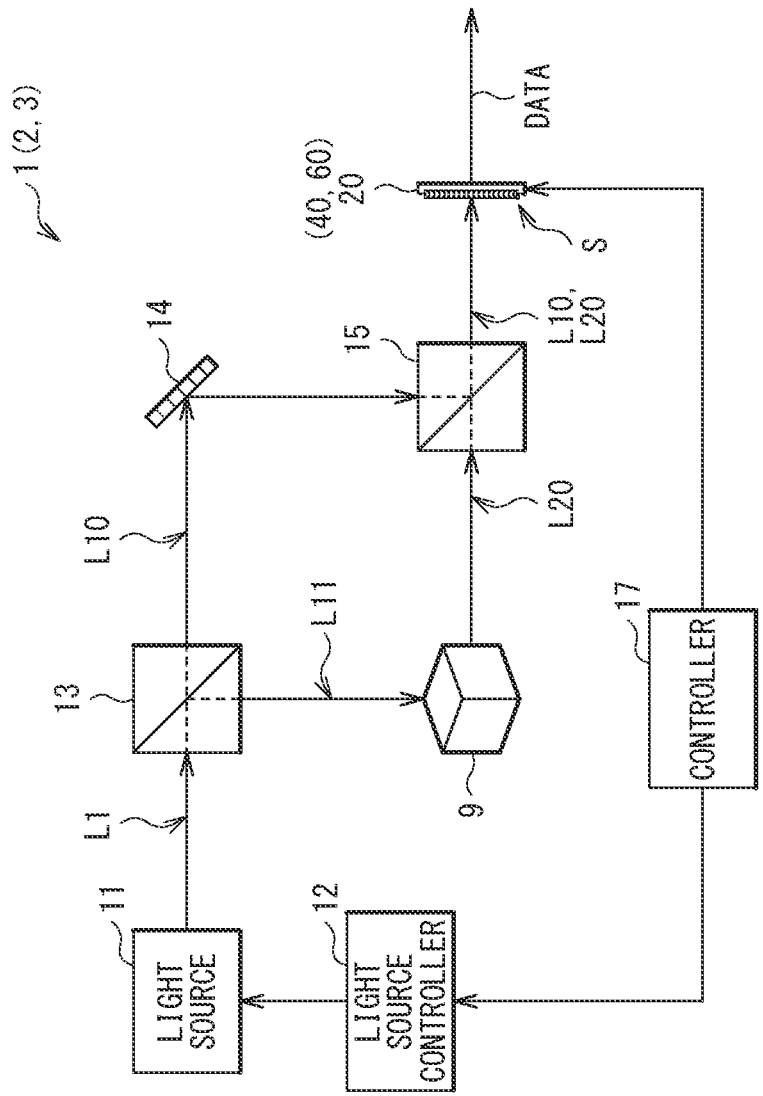

[FIG. 2]
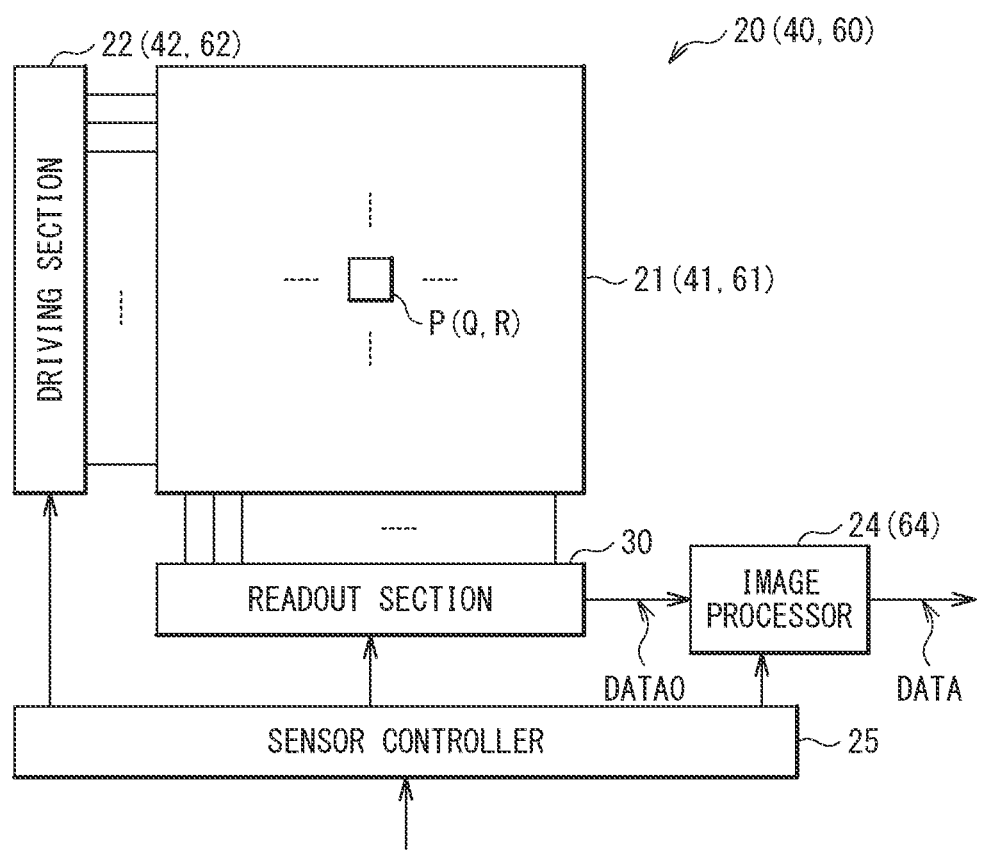

[FIG. 3]
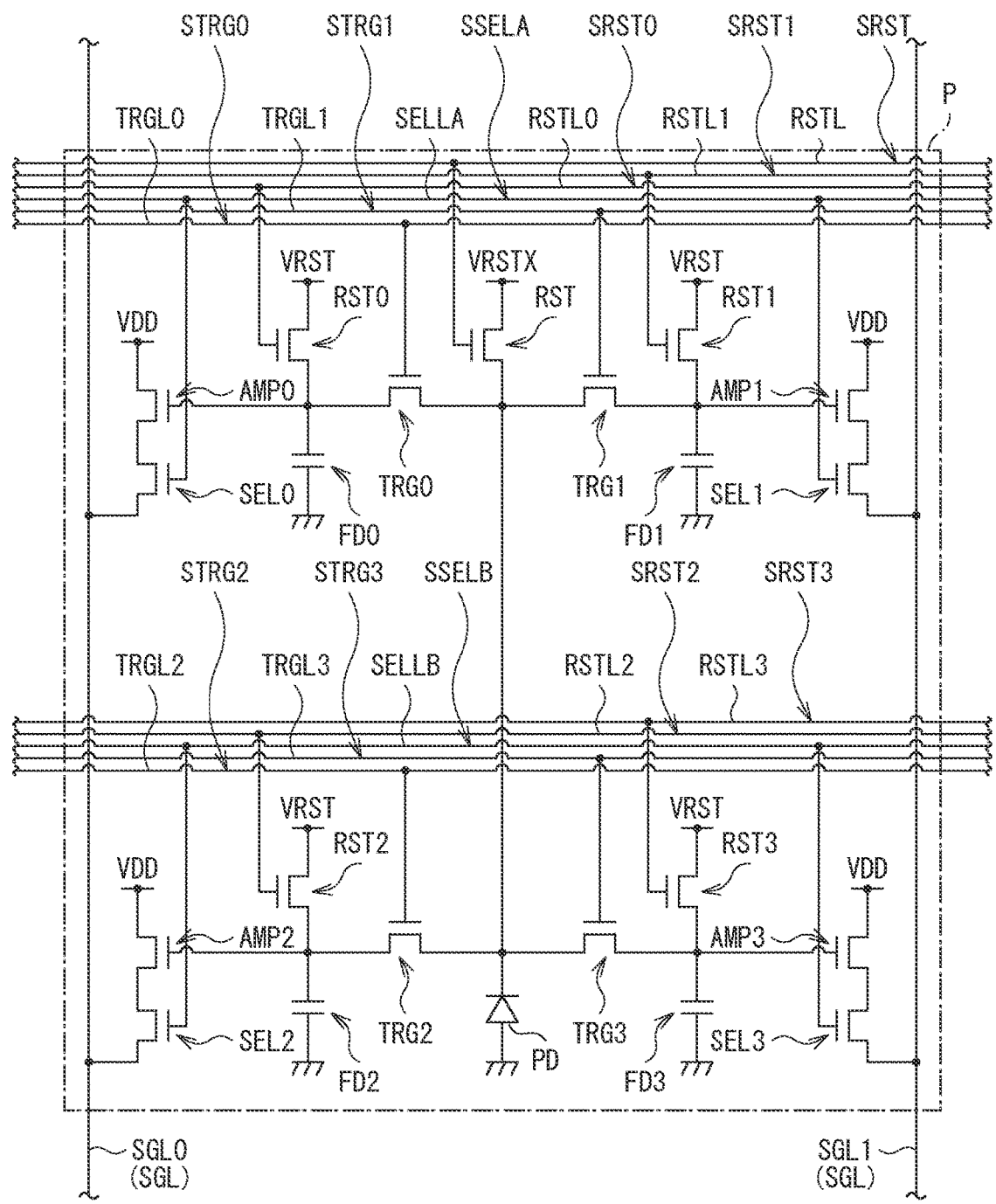

[FIG. 4]
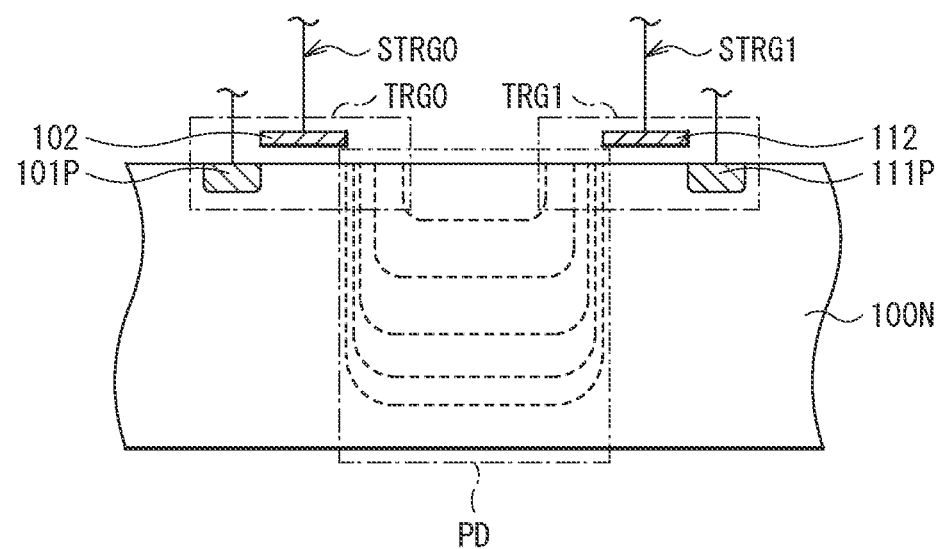

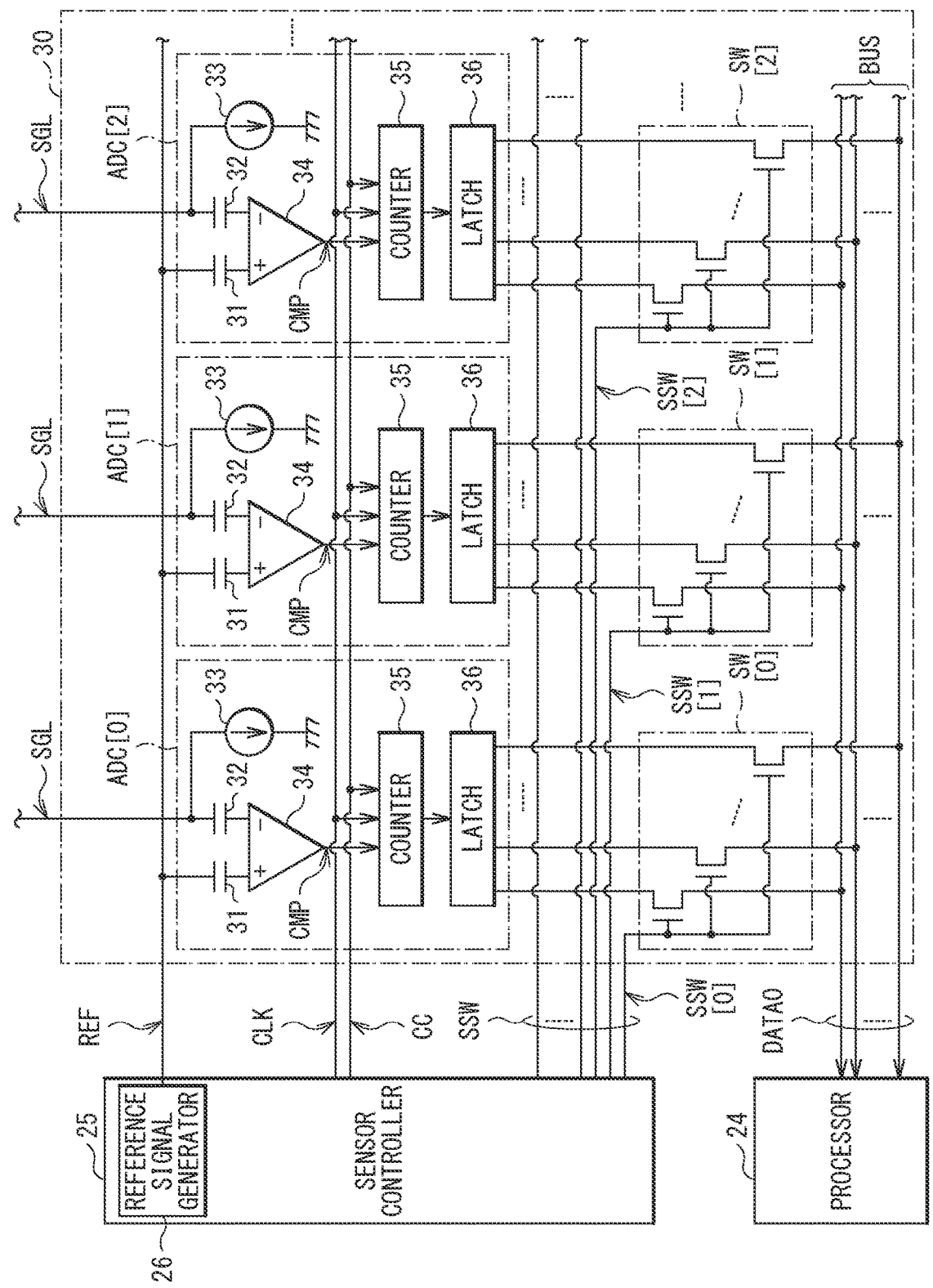

[FIG. 6]
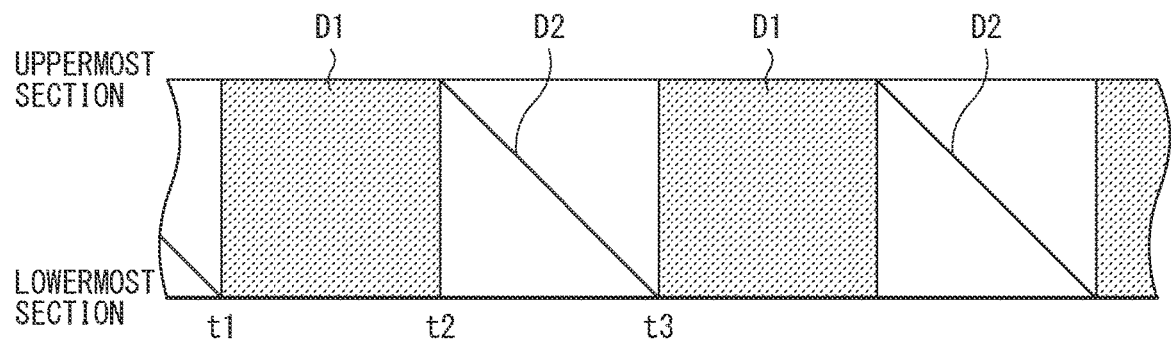

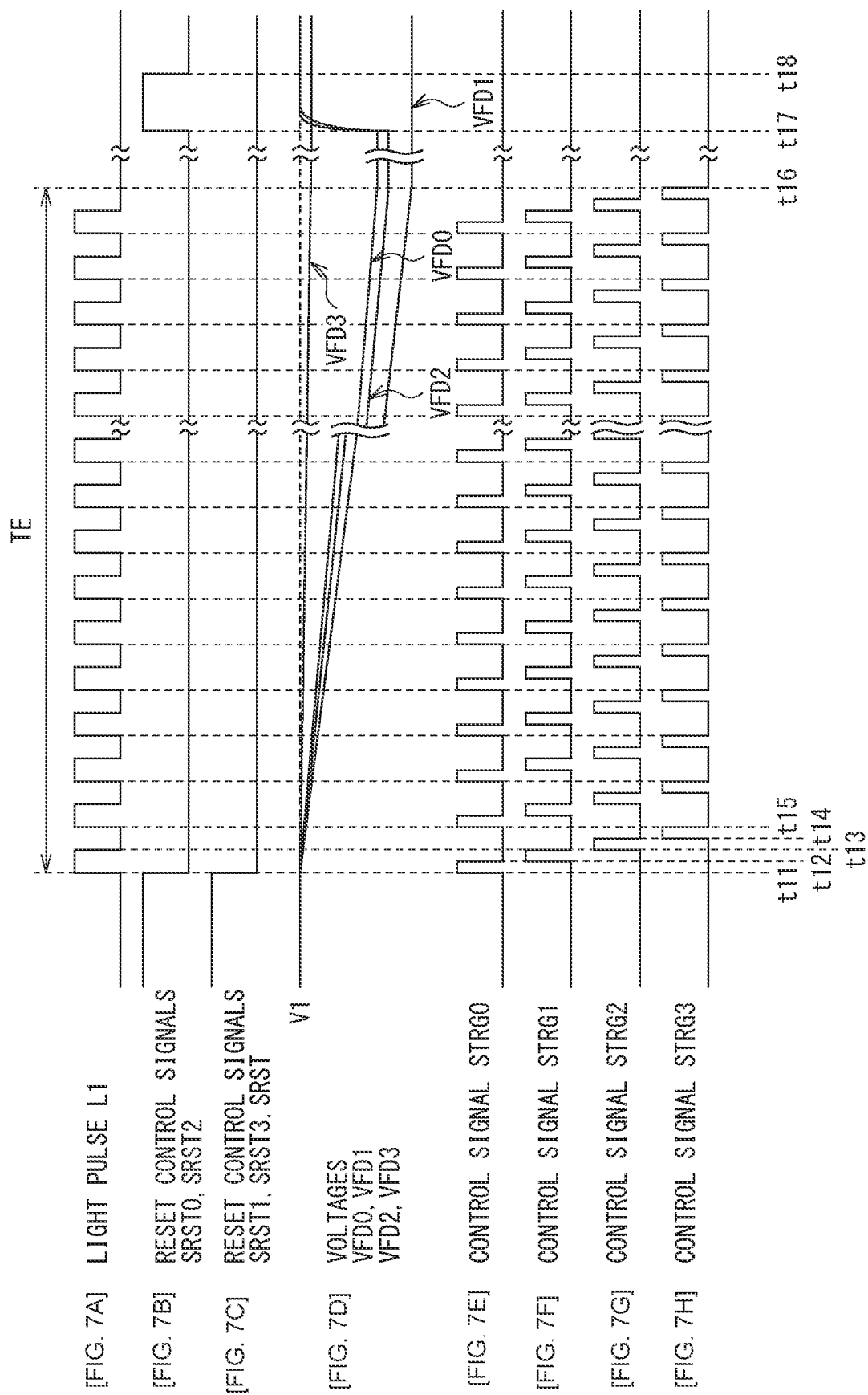

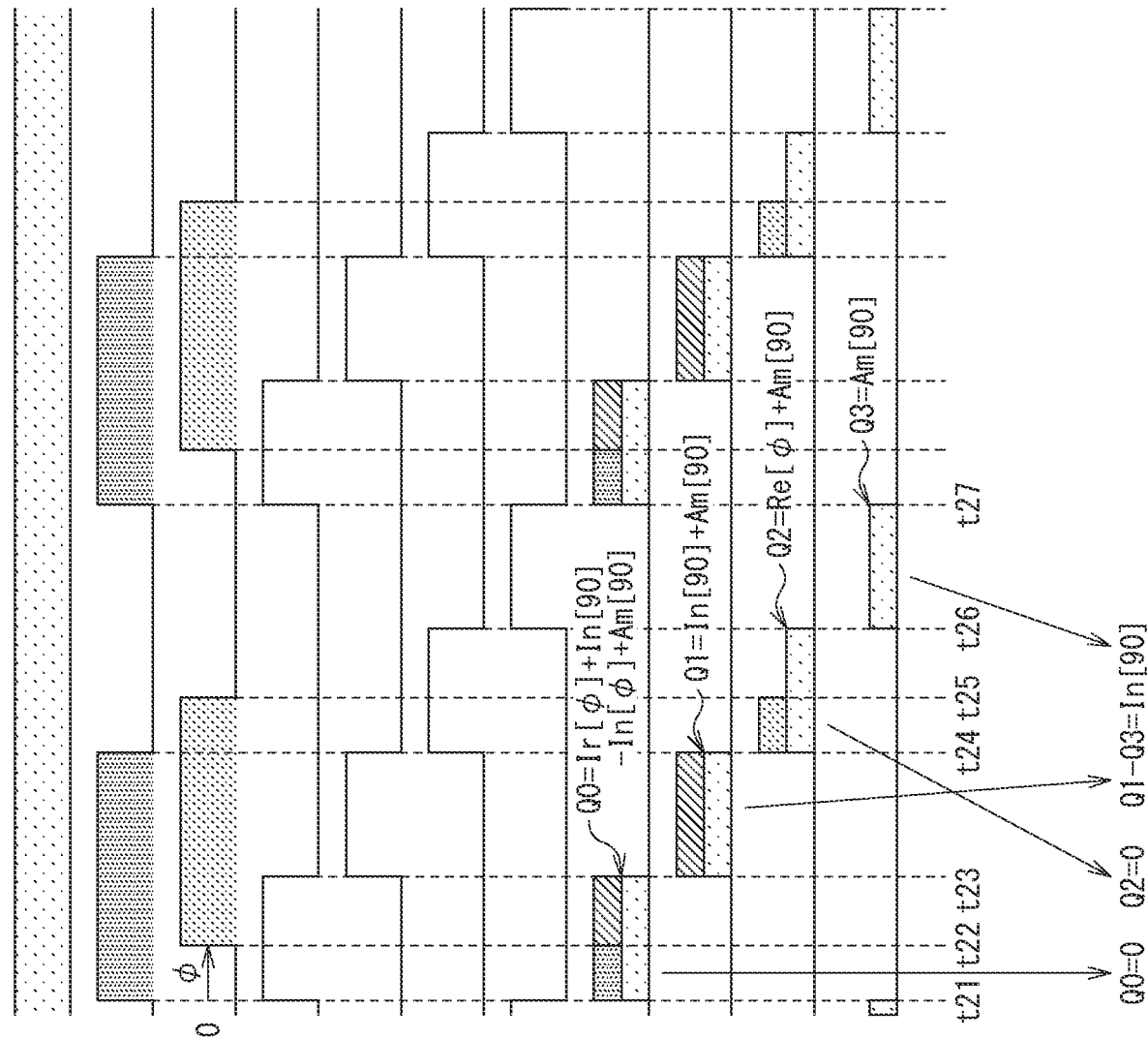

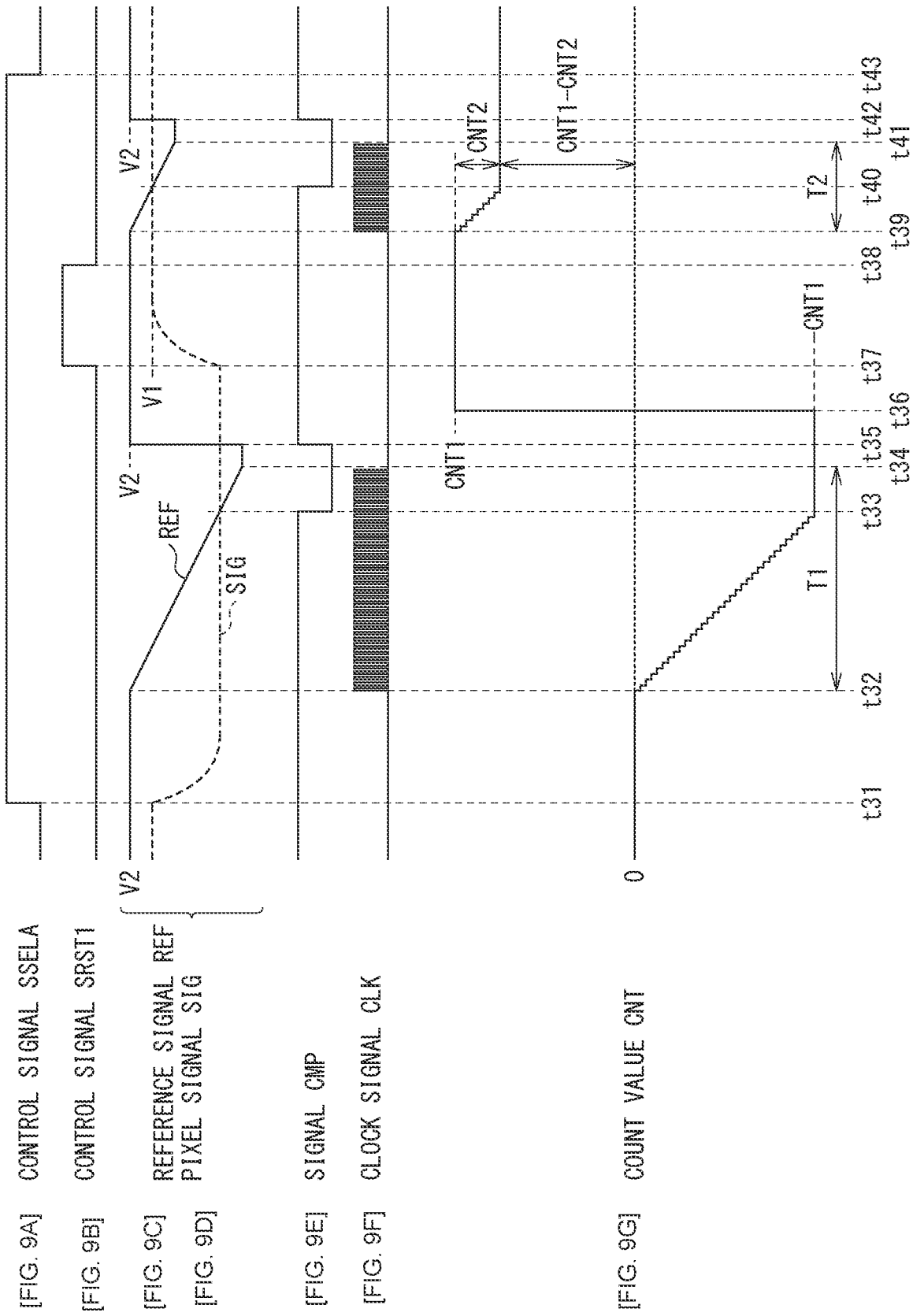

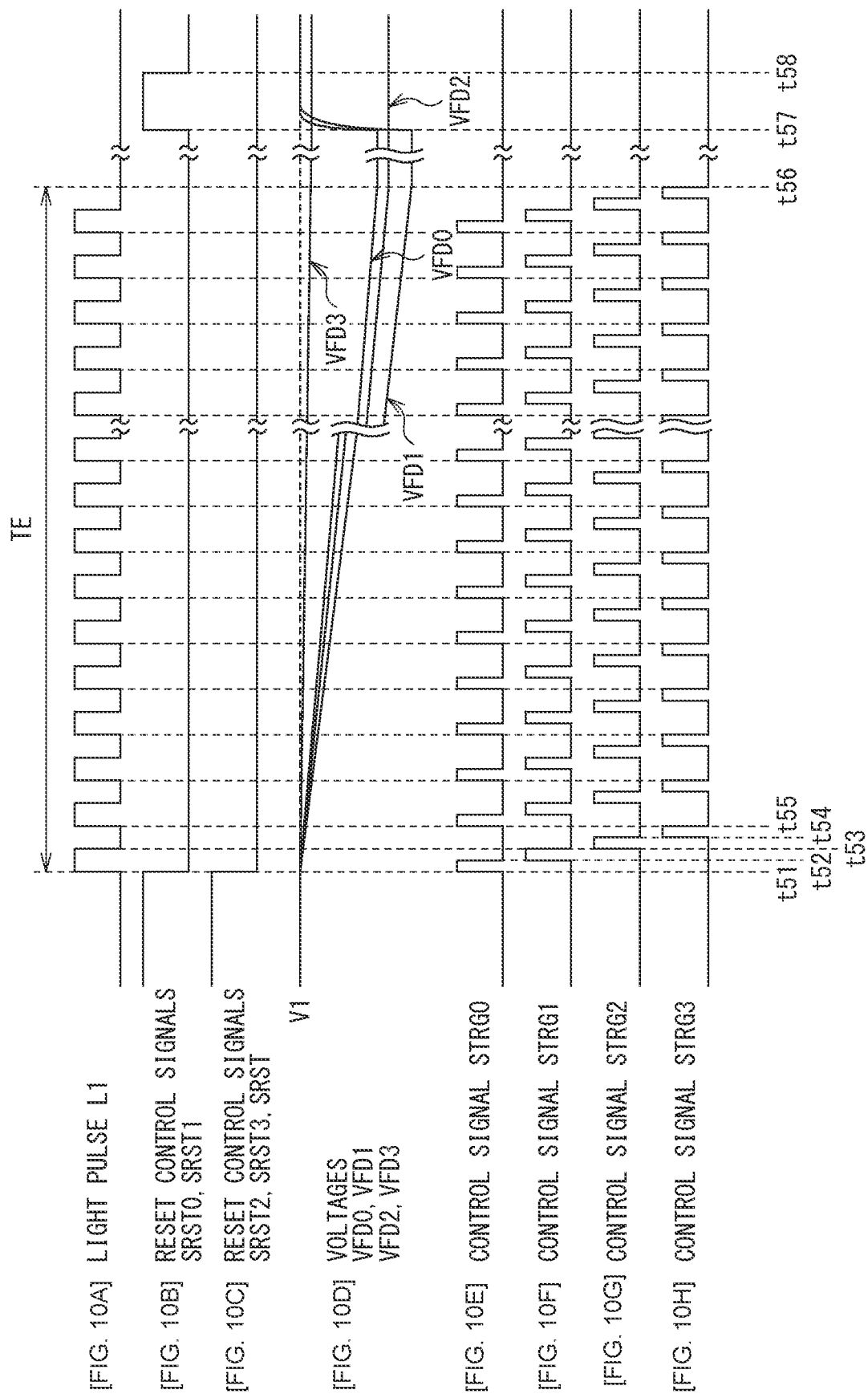

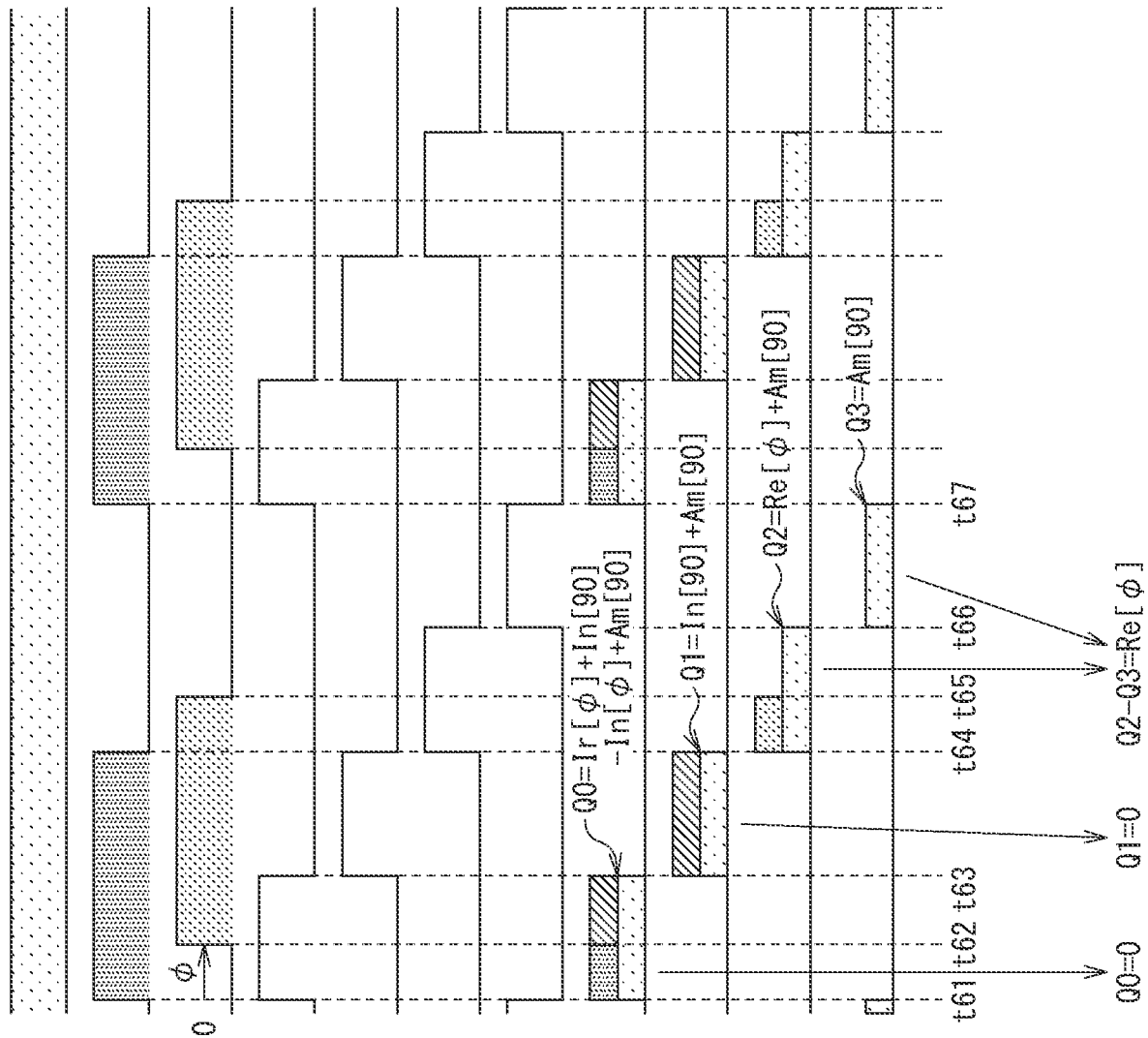

[FIG. 12]
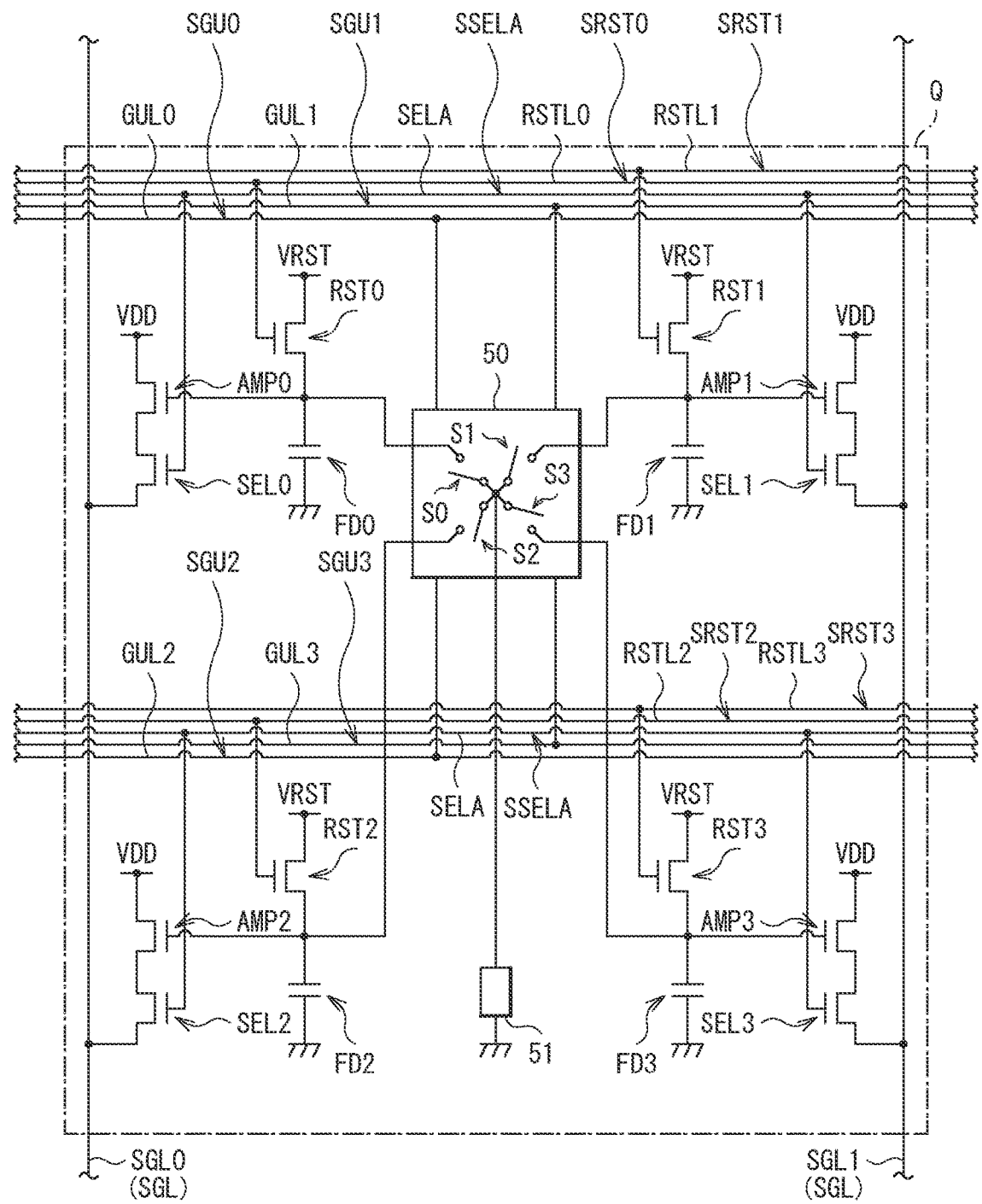

[FIG. 13A]
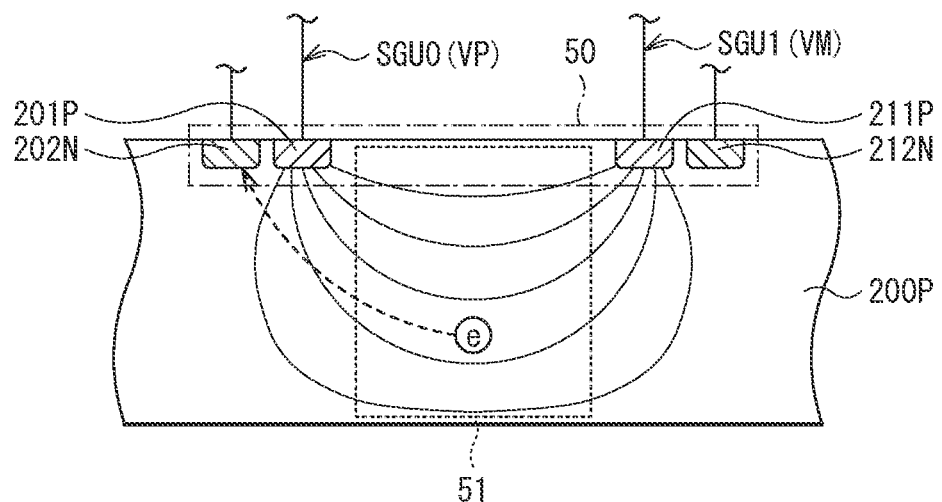
[FIG. 13B]
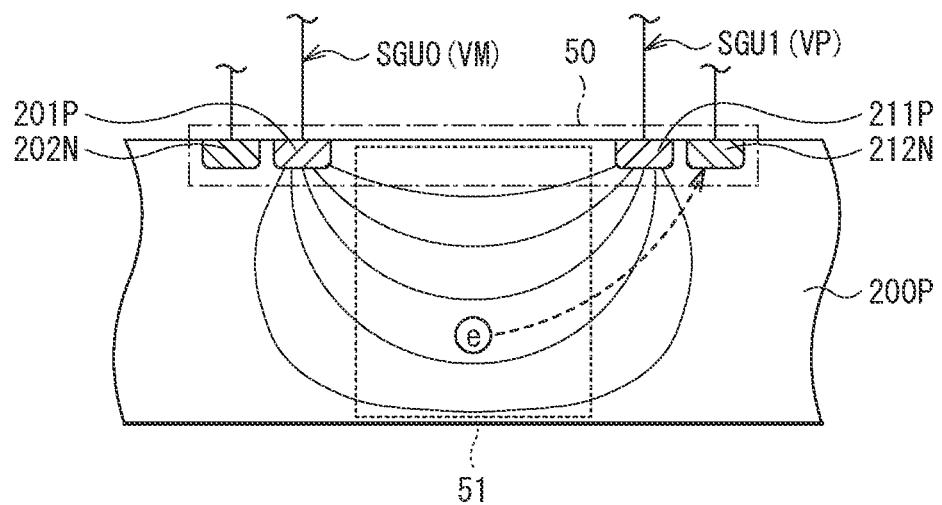

[FIG. 14]
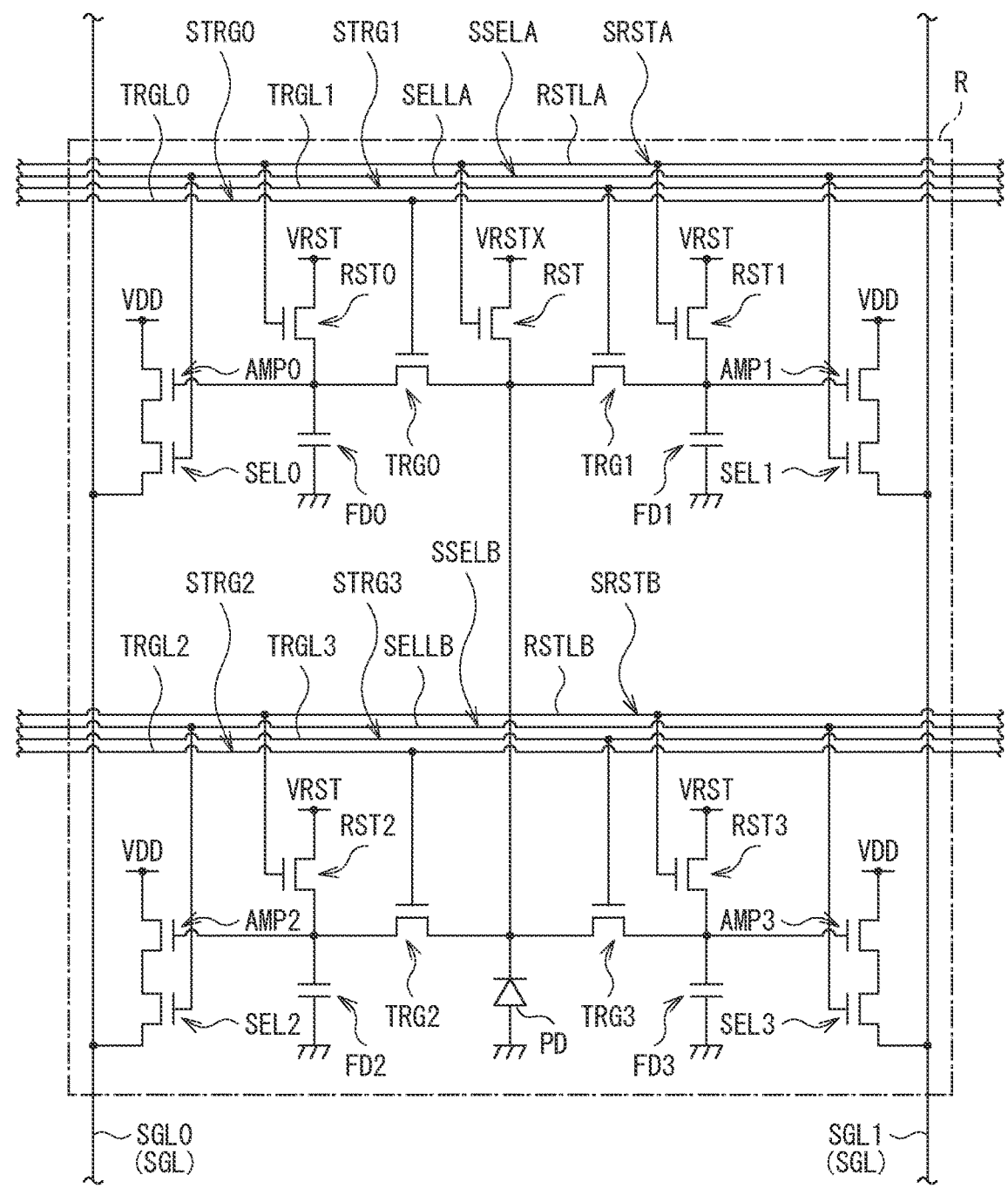

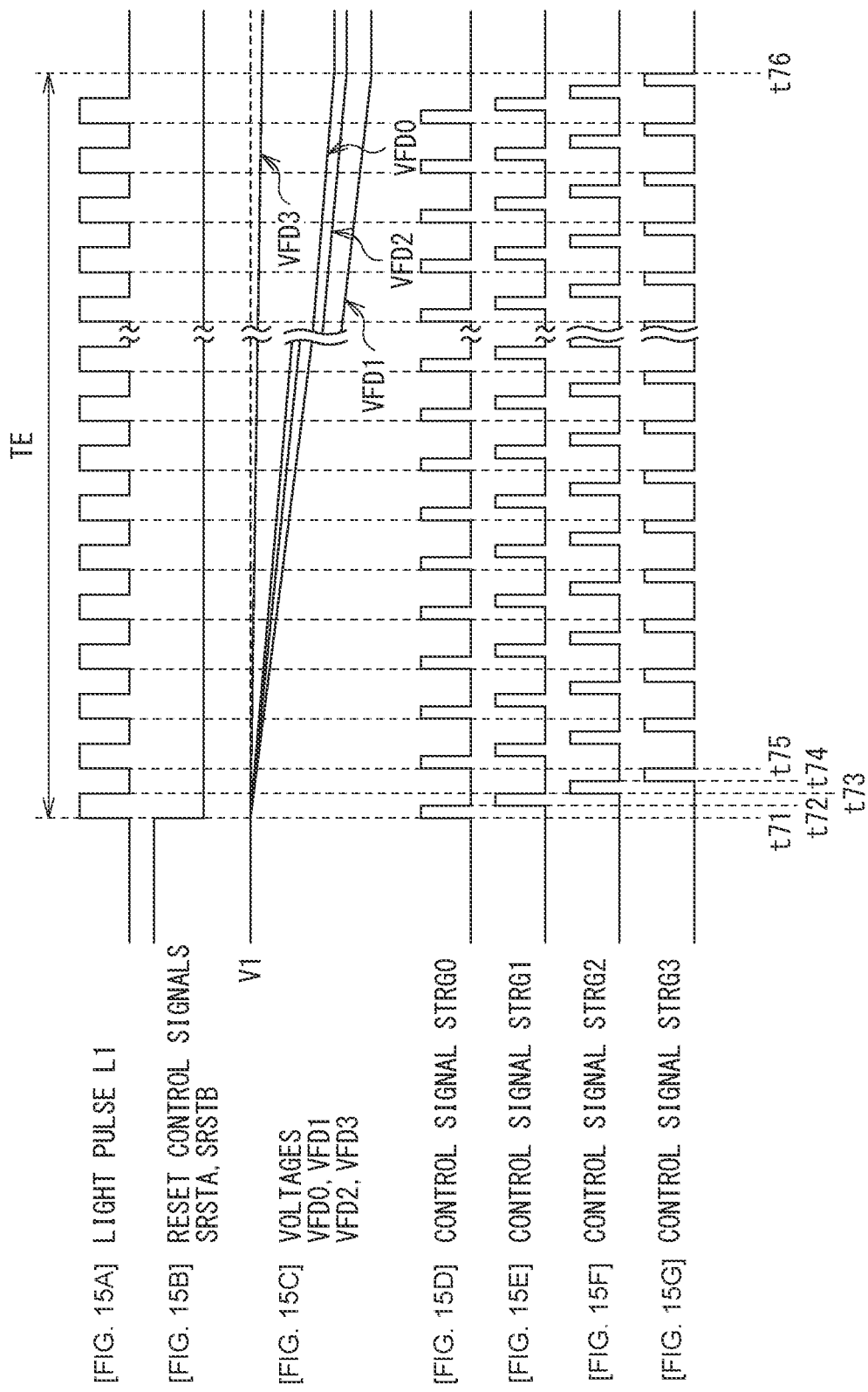

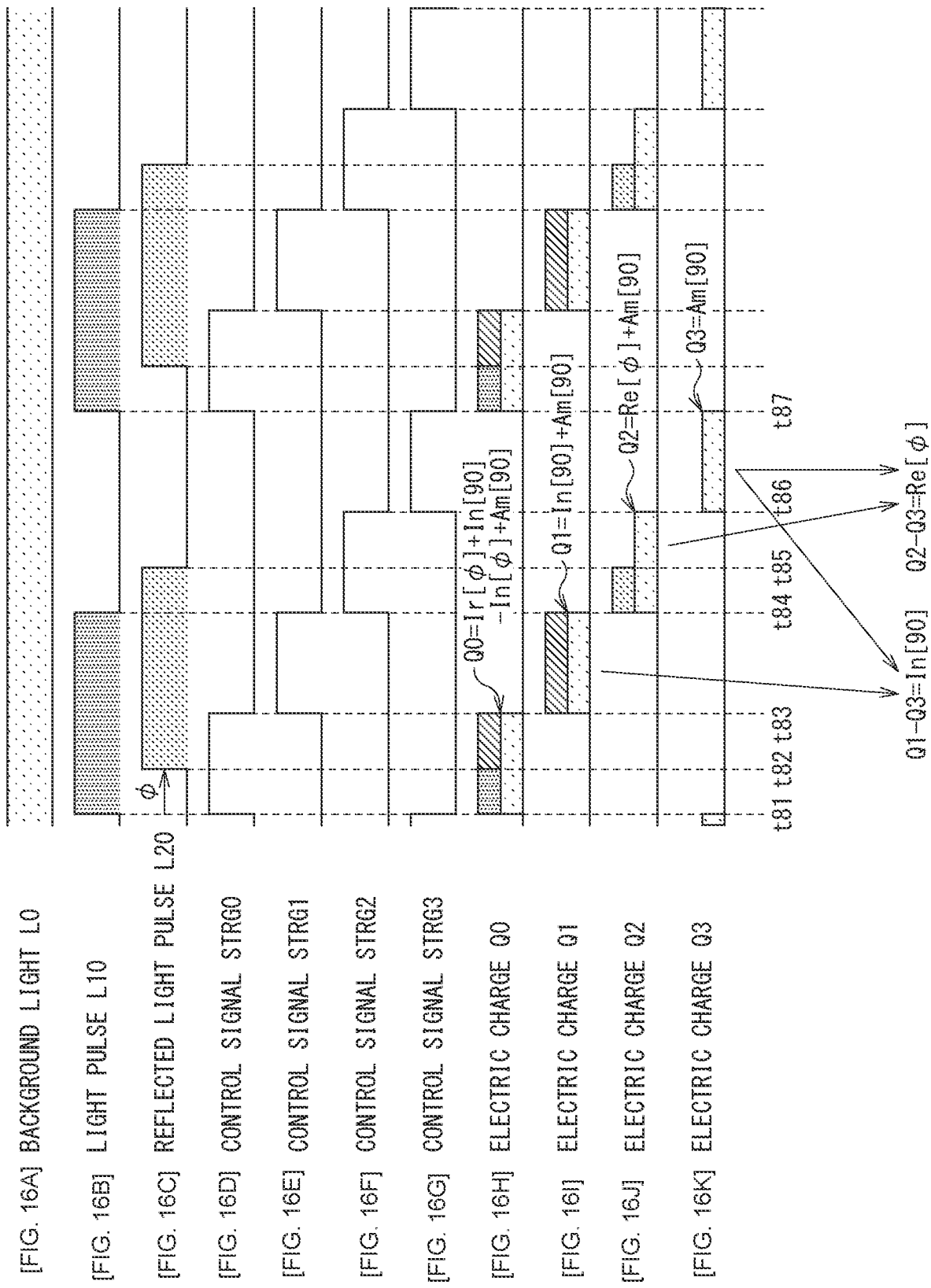

MEASUREMENT DEVICE

CROSS REFERENCE TO RELATED APPLICATIONS

This application is a U.S. National Phase of International Patent Application No. PCT/JP2019/024232 filed on Jun. 19, 2019, which claims priority benefit of Japanese Patent Application No. JP 2018-144862 filed in the Japan Patent Office on Aug. 1, 2018. Each of the above-referenced applications is hereby incorporated herein by reference in its entirety.

TECHNICAL FIELD

The present disclosure relates to a measurement device used for digital holography.

BACKGROUND ART

In digital holography, for example, light emitted from a light source and light reflected by a measurement target are caused to interfere with each other, and interference fringes generated by interference between these kinds of light are detected, thereby making it possible to obtain information about a three-dimensional shape of the measurement target. For example, PTL 1 discloses a technology for removing a background light component included in detected light in a case where interference fringes are detected with use of pre-detected background light.

CITATION LIST

Patent Literature

PTL 1: Japanese Unexamined Patent Application Publication No. H11-194011

SUMMARY OF THE INVENTION

In digital holography, high measurement accuracy is desired, and a further improvement in measurement accuracy is expected.

It is desirable to provide a measurement device that makes it possible to enhance measurement accuracy.

A measurement device according to an embodiment of the present disclosure includes a pixel and a processor. The pixel includes a light receiver, a plurality of storage sections, and an electric charge supplying section. The light receiver is configured to generate received-light electric charge by performing photoelectric conversion on the basis of light. The plurality of storage sections is configured to store the received-light electric charge. The plurality of storage sections includes a first storage section and a second storage section. The electric charge supplying section is configured to selectively supply the received-light electric charge generated by the light receiver to the plurality of storage sections. The processor is configured to generate a first detection value on the basis of an electric charge amount of the received-light electric charge stored in the first storage section, is configured to generate a second detection value on the basis of an electric charge amount of the received-light electric charge stored in the second storage section, and is configured to generate a first pixel value on the basis of a difference between the first detection value and the second detection value.

In the measurement device according to the embodiment of the present disclosure, the pixel includes the light receiver, the plurality of storage sections, and the electric charge supplying section. In the light receiver, the received-light electric charge is generated by performing photoelectric conversion on the basis of light. The received-light electric charge generated by the light receiver is selectively supplied to the plurality of storage sections by the electric charge supplying section. In the processor, the first detection value is generated on the basis of the electric charge amount of the received-light electric charge stored in the first storage section of the plurality of storage sections, and the second detection value is generated on the basis of the electric charge amount of the received-light electric charge stored in the second storage section. The first pixel value is then generated on the basis of a difference between the first detection value and the second detection value.

According to the measurement device according to the embodiment of the present disclosure, the first detection value is generated on the basis of the electric charge amount of the received-light electric charge stored in the first storage section, the second detection value is generated on the basis of the electric charge amount of the received-light electric charge stored in the second storage section, and the first pixel value is then generated on the basis of a difference between the first detection value and the second detection value, which makes it possible to enhance measurement accuracy. It is to be noted that effects described here are not necessarily limitative, and any of effects described in the present disclosure may be provided.

BRIEF DESCRIPTION OF DRAWINGS

FIG. 1 is a configuration diagram illustrating a configuration example of a measurement device according to an embodiment of the present disclosure.

FIG. 2 is a block diagram illustrating a configuration example of a sensor illustrated in FIG. 1.

FIG. 3 is a circuit diagram illustrating a configuration example of a pixel illustrated in FIG. 2.

FIG. 4 is an explanatory diagram illustrating a configuration example of a main part of the pixel illustrated in FIG. 3.

FIG. 5 is a circuit diagram illustrating a configuration example of a readout section illustrated in FIG. 2.

FIG. 6 is a timing chart illustrating an operation example of the measurement device illustrated in FIG. 1.

FIGS. 7A, 7B, 7C, 7D, 7E, 7F, 7G, and 7H are timing charts illustrating an example of an exposure operation in a measurement device according to a first embodiment.

FIGS. 8A, 8B, 8C, 8D, 8E, 8F, 8G, 8H, 8I, 8J, and 8K are other timing charts illustrating an example of the exposure operation in the measurement device according to the first embodiment.

FIGS. 9A, 9B, 9C, 9D, 9E, 9F, and 9G are other timing charts illustrating an example of a readout operation in the measurement device according to the first embodiment.

FIGS. 10A 10B 10C, 10D, 10E, 10F, 10G, and 10H are other timing charts illustrating an example of the exposure operation in the measurement device according to the first embodiment.

FIGS. 11A, 11B, 11C, 11D, 11E, 11F, 11G, 11H, 11I, 11J, and 11K are other timing charts illustrating an example of the exposure operation in the measurement device according to the first embodiment.

FIG. 12 is a circuit diagram illustrating a configuration example of a pixel according to a second embodiment.

FIG. 13A is an explanatory diagram illustrating an operation example of an electric charge partitioning section illustrated in FIG. 12.

FIG. 13B is another explanatory diagram illustrating an operation example of the electric charge partitioning section illustrated in FIG. 12.

FIG. 14 is a circuit diagram illustrating a configuration example of a pixel according to a third embodiment.

FIGS. 15A, 15B, 15C, 15D, 15E, 15F, and 15G are timing charts illustrating an example of an exposure operation in a measurement device according to the third embodiment.

FIGS. 16A, 16B, 16C, 16D, 16E, 16F, 16G, 16H, 16I, 16J, and 16K are other timing charts illustrating an example of the exposure operation in the measurement device according to the third embodiment.

MODES FOR CARRYING OUT THE INVENTION

Hereinafter, some embodiments of the present disclosure are described in detail with reference to the drawings. It is to be noted that description is given in the following order.
1. First Embodiment
2. Second Embodiment
3. Third Embodiment

1. First Embodiment

Configuration Example

FIG. 1 illustrates a configuration example of a measurement device (a measurement device 1) according to an embodiment. The measurement device 1 is configured to generate a depth image indicating a three-dimensional shape of a measurement target by causing light emitted from a light source and light reflected by the measurement target to interfere with each other and detecting interference fringes generated by interference between these kinds of light. The measurement device 1 includes a light source 11, a light source controller 12, a beam splitter 13, a plane mirror 14, a beam combiner 15, a sensor 20, and a controller 17.

The light source 11 is configured to emit a coherent light pulse L1 toward the beam splitter 13. The light source 11 is configured with use of a laser light source, for example. The light source controller 12 is configured to control an operation of the light source 11 on the basis of an instruction from the controller 17. The light source 11 performs a light emission operation of alternating between emission and non-emission of light to emit the light pulse L1.

The beam splitter 13 is configured to split the incident light pulse L1 into two light pulses L10 and L11. Specifically, the beam splitter 13 allows a portion of the incident light pulse L1 to be transmitted therethrough, thereby outputting the transmitted light as the light pulse L10, and reflects a portion of the incident light pulse L1, thereby outputting the reflected light as the light pulse L11.

The plane mirror 14 is configured to reflect the light pulse L10 outputted from the beam splitter 13 toward the beam combiner 15.

A measurement target 9 is a target to be measured by the measurement device 1, and has a three-dimensional shape. The light pulse L11 outputted from the beam splitter 13 is reflected by the measurement target 9, and enters the beam combiner 15 as a reflected light pulse L20.

The beam combiner 15 is configured to combine the incident light pulse L10 and the reflected light pulse L20. Specifically, the beam combiner 15 reflects the incident light pulse L10, and allows the incident reflected light pulse L20 to be transmitted therethrough, thereby outputting the light pulse L10 and the reflected light pulse L20 toward a light reception surface S of the sensor 20. An optical axis of the light pulse L10 and an optical axis of the reflected light pulse L20 may coincide with each other, or may be different from each other.

Light of the reflected light pulse L20 outputted from the beam combiner 15 is light including information about the three-dimensional shape of the measurement target 9. In addition, light of the light pulse L10 outputted from the beam combiner 15 is light not including information about the three-dimensional shape of the measurement target 9. That is, the light of the light pulse L10 is so-called reference light. A phase of a light wave in the reflected light pulse L20 is shifted from a phase of a light wave in the light pulse L10, which is the reference light, in accordance with the three-dimensional shape of the measurement target 9. The light wave in the light pulse L10 outputted from the beam combiner 15 and the light wave in the reflected light pulse L20 outputted from the beam combiner 15 interfere with each other in accordance with the three-dimensional shape of the measurement target 9. As a result, interference fringes in accordance with the three-dimensional shape of the measurement target 9 are formed on the light reception surface S of the sensor 20.

The sensor 20 is configured to generate a depth image PIC by detecting the interference fringes formed by the light pulse L10 and the reflected light pulse L20 outputted from the beam combiner 15. The sensor 20 then outputs the generated depth image PIC as an image signal DATA. The sensor 20 is configured with use of a CMOS (complementary metal oxide semiconductor) image sensor, for example.

The controller 17 is configured to control an operation of the measurement device 1 by supplying a control signal to the light source controller 12 and the sensor 20 and controlling operations thereof.

FIG. 2 illustrates a configuration example of the sensor 20. The sensor 20 includes a pixel array 21, a driving section 22, a readout section 30, an image processor 24, and a sensor controller 25.

The pixel array 21 includes a plurality of pixels P arranged in a matrix form. Each of the pixels P is configured to output a pixel signal SIG corresponding to an amount of received light.

FIG. 3 illustrates a configuration example of the pixel P. The pixel array 21 includes a plurality of control lines TRGL0, a plurality of control lines TRGL1, a plurality of control lines TRGL2, a plurality of control lines TRGL3, a plurality of selection control lines SELLA, a plurality of selection control lines SELLB, a plurality of reset control lines RSTL0, a plurality of reset control lines RSTL1, a plurality of reset control lines RSTL2, a plurality of reset control lines RSTL3, a plurality of reset control lines RSTL, a plurality of signal lines SGL0, and a plurality of signal lines SGL1. The control lines TRGL0, TRGL1, TRGL2, and TRGL3 extend in a horizontal direction (a transverse direction in FIGS. 2 and 3). A control signal STRG0 is applied to the control lines TRGL0 by the driving section 22. A control signal STRG1 is applied to the control lines TRGL1 by the driving section 22. A control signal STRG2 is applied to the control lines TRGL2 by the driving section 22. A control signal STRG3 is applied to the control lines TRGL3 by the driving section 22. The selection control lines SELLA and SELLB extend in the horizontal direction. A selection control signal SSELA is applied to the selection control lines SELLA by the driving section 22, and a selection control signal SSELB is applied to the selection control lines SELLB by the driving section 22. The reset control lines RSTL0, RSTL1, RSTL2, RSTL3, and RSTL extend in the horizontal direction. A reset control signal SRST0 is applied to the reset control lines RSTL0 by the driving section 22. A reset control signal SRST1 is applied to the reset control lines RSTL1 by the driving section 22. A reset control signal SRST2 is applied to the reset control line RSTL2 by the driving section 22. A reset control signal SRST3 is applied to the reset control lines RSTL3 by the driving section 22. A reset control signal SRST is applied to the reset control lines RSTL by the driving section 22. The signal lines SGL0 and SGL1 extend in a vertical direction (a longitudinal direction in FIGS. 2 and 3). The signal lines SGL0 and SGL1 transmits the pixel signals SIG to the readout section 30. The pixels P in one row configures a pixel line L.

The pixel P includes a photodiode PD, transistors TRG0, TRG1, TRG2, and TRG3, floating diffusions FD0, FD1, FD2, and FD3, transistors RST0, RST1, RST2, RST3, and RST, transistors AMP0, AMP1, AMP2, and AMP3, and transistors SEL0, SEL1, SEL2, and SEL3. The transistors TRG0 to TRG3, RST0 to RST3, RST, AMP0 to AMP3, and SEL0 to SEL3 are N-type MOS (Metal Oxide Semiconductor) transistors in this example.

The photodiode PD is a photoelectric converter that generates electric charge corresponding to an amount of received light. The photodiode PD has an anode grounded, and a cathode coupled to sources of the transistors TRG0, TRG1, TRG2, and TRG3 and a source of the transistor RST.

The transistor RST has a gate coupled to the reset control line RSTL, a drain supplied with a voltage VRSTX, and the source coupled to the cathode of the photodiode PD and the sources of the transistors TRG0 to TRG3.

The transistor TRG0 has a gate coupled to the control line TRGL0, the source coupled to the cathode of the photodiode PD and the sources of the transistors TRG1, TRG2, TRG3, and RST, and a drain coupled to the floating diffusion FD0, a source of the transistor RST0, and a gate of the transistor AMP0. The floating diffusion FD0 is configured to store electric charge supplied from the photodiode PD through the transistor TRG0. The floating diffusion FD0 is configured with use of a diffusion layer formed on a surface of a semiconductor substrate, for example. In this FIG. 3, the floating diffusion FD0 is illustrated using a symbol of a capacitor. The transistor RST0 has a gate coupled to the reset control line RSTL0, a drain supplied with a voltage VRST, and the source coupled to the floating diffusion FD0, the drain of the transistor TRG0, and the gate of the transistor AMP0. The transistor AMP0 has the gate coupled to the floating diffusion FD0, the drain of the transistor TRG0, and the source of the transistor RST0, a drain supplied with a power source voltage VDD, and a source coupled to a drain of the transistor SEL0. The transistor SEL0 has a gate coupled to the selection control line SELLA, the drain coupled to the source of the transistor AMP0, and a source coupled to the signal line SGL0.

The transistor TRG1 has a gate coupled to the control line TRGL1, the source coupled to the cathode of photodiode PD, the sources of the transistors TRG0, TRG2, TRG3, and RST, and a drain coupled to the floating diffusion FD1, a source of the transistor RST1, and a gate of the transistor AMP1. The floating diffusion FD1 is configured to store electric charge supplied from the photodiode PD through the transistor TRG1. The transistor RST1 has a gate coupled to the reset control line RSTL1, a drain supplied with the voltage VRST1, and the source coupled to the floating diffusion FD1, the drain of the transistor TRG1, and the gate of the transistor AMP1. The transistor AMP1 has the gate coupled to the floating diffusion FD1, the drain of the transistor TRG1, and the source of the transistor RST1, a drain supplied with the power source voltage VDD, and a source coupled to a drain of the transistor SEL1. The transistor SEL1 has a gate coupled to the selection control line SELLA, the drain coupled to the source of the transistor AMP1, and a source coupled to the signal line SGL1.

The transistor TRG2 has a gate coupled to the control line TRGL2, the source coupled to the cathode of the photodiode PD and the sources of the transistors TRG0, TRG1, TRG3, and RST, and a drain coupled to the floating diffusion FD2, a source of the transistor RST2, and a gate of the transistor AMP2. The floating diffusion FD2 is configured to store electric charge supplied from the photodiode PD through the transistor TRG2. The transistor RST2 has a gate coupled to the reset control line RSTL2, a drain supplied with the voltage VRST, and the source coupled to the floating diffusion FD2, the drain of the transistor TRG2, and the gate of the transistor AMP2. The transistor AMP2 has the gate coupled to the floating diffusion FD2, the drain of the transistor TRG2, and the source of the transistor RST2, a drain supplied with the power source voltage VDD, and a source coupled to a drain of the transistor SEL2. The transistor SEL2 has a gate coupled to the selection control line SELLB, the drain coupled to the source of the transistor AMP2, and a source coupled to the signal line SGL0.

The transistor TRG3 has a gate coupled to the control line TRGL3, the source coupled to the cathode of the photodiode PD and the sources of the transistors TRG0, TRG1, TRG2, and RST, and a drain coupled to the floating diffusion FD3, a source of the transistor RST3, and a gate of the transistor AMP3. The floating diffusion FD3 is configured to store electric charge supplied from the photodiode PD through the transistor TRG3. The transistor RST3 has a gate coupled to the reset control line RSTL3, a drain supplied with the voltage VRST, and the source coupled to the floating diffusion FD3, the drain of the transistor TRG3, and the gate of the transistor AMP3. The transistor AMP3 has the gate coupled to the floating diffusion FD3, the drain of the transistor TRG3, and the source of the transistor RST3, a drain supplied with the power source voltage VDD, and a source coupled to a drain of the transistor SEL3. The transistor SEL3 has a gate coupled to the selection control line SELLB, the drain coupled to the source of the transistor AMP3, and a source coupled to the signal line SGL1.

With this configuration, in the pixel P, in an exposure operation D1, the transistors TRG0 to TRG3 are turned on or off to cause one of the transistors TRG0 to TRG3 to be turned on, and electric charge generated in the photodiode PD is selectively stored in the floating diffusions FD0 to FD3. Thereafter, in a readout operation D2, the pixel P then supplies, as the pixel signal SIG, a voltage corresponding to an amount of electric charge in the floating diffusions FD0 to FD3 to the readout section 30 through the signal lines SGL0 and SGL1.

FIG. 4 schematically illustrates a main part of the pixel P. FIG. 4 illustrates the photodiode PD and the transistors TRG0 and TRG1. A substrate 100N is an N-type semiconductor substrate. The transistor TRG0 includes a diffusion layer 101P and a gate electrode 102. The diffusion layer 101P is a P-type semiconductor layer formed on a surface of the substrate 100N, and corresponds to the drain of the transistor TRG0. The transistor TRG1 includes a diffusion layer 111P and a gate electrode 112. The diffusion layer 111P is a P-type semiconductor layer formed on the surface of the substrate 100N, and corresponds to the drain of the transistor TRG1. It is to be noted that the light reception surface S may be a surface (an upper surface in FIG. 4) on a side where the transistors TRG0 and TRG1 are provided, or a surface (a lower surface in FIG. 4) opposite to the side where the transistors TRG0 and TRG1 are provided.

The driving section 22 (FIG. 2) is configured to drive the plurality of pixels P in the pixel array 21 on the basis of an instruction from the sensor controller 25. Specifically, the driving section 22 applies the control signal STRG0 to the plurality of control lines TRGL0 (FIG. 3), applies the control signal STRG1 to the plurality of control lines TRGL1, applies the control signal STRG2 to the plurality of control lines TRGL2, and applies the control signal STRG3 to the plurality of control lines TRGL3. In addition, the driving section 22 applies the selection control signal SSELA to the plurality of selection control lines SELLA, and applies the selection control signal SSELB to the plurality of selection control lines SELLB. In addition, the driving section 22 applies the reset control signal SRST0 to the plurality of reset control lines RSTL0, applies the reset control signal SRST1 to the plurality of reset control lines RSTL1, applies the reset control signal SRST2 to the plurality of reset control lines RSTL2, applies the reset control signal SRST3 to the plurality of reset control lines RSTL3, and applies the reset control signal SRST to the plurality of reset control lines RSTL. In addition, the driving section 22 generates the voltages VRST and VRSTX.

The readout section 30 (FIG. 2) is configured to generate an image signal DATA0 by performing AD conversion on the basis of the pixel signals SIG supplied from the pixel array 21 through the signal lines SGL (the signal lines SGL0 and SGL1).

FIG. 5 illustrates a configuration example of the readout section 30. It is to be noted that FIG. 5 also illustrates the image processor 24 and the sensor controller 25 in addition to the readout section 30. The readout section 30 includes a plurality of AD (Analog to Digital) converters ADC (AD converters ADC[0], ADC[1], ADC[2], ... ), a plurality of switch sections SW (switch sections SW[0], SW[1], and SW[2], ... ), and a bus wiring line BUS.

Each of the plurality of AD converters ADC is configured to convert a voltage of the pixel signal SIG into a digital code CODE by performing AD conversion on the basis of the pixel signal SIG supplied from the pixel array 21. The plurality of AD converters ADC is provided corresponding to the plurality of signal lines SGL. Specifically, a 0th AD converter ADC[0] is provided corresponding to a 0th signal line SGL[0], a first AD converter ADC[1] is provided corresponding to a first signal line SGL[1], and a second AD converter ADC[2] is provided corresponding to a second signal line SGL[2]. The AD converter ADC includes capacitors 31 and 32, a current source 33, a comparator 34, a counter 35, and a latch 36.

The capacitor 31 has one end supplied with a reference signal REF from the sensor controller 25, and another end coupled to a positive input terminal of the comparator 34. The reference signal REF has a so-called ramp waveform in which a voltage level is gradually decreased over time in two periods (conversion periods T1 and T2) in which AD conversion is performed, as described later. The capacitor 32 has one end coupled to the signal line SGL, and another end coupled to a negative input terminal of the comparator 34. The current source 33 is configured to cause a current having a predetermined current value to flow from the signal line SGL to a ground.

The comparator 34 has the positive input terminal coupled to the other end of the capacitor 31, the negative input terminal coupled to the other end of the capacitor 32, and an output terminal coupled to the counter 35. The comparator 34 is configured to compare a voltage at the positive input terminal with a voltage at the negative input terminal and output a result of such comparison as a signal CMP. In addition, the comparator 34 is configured to be able to perform zero adjustment for setting voltage values in the capacitors 31 and 32. The counter 35 is configured to perform a count operation on the basis of the signal CMP supplied from the comparator 34, and a clock signal CLK and a control signal CC supplied from the sensor controller 25. The latch 36 is configured to output a count value CNT obtained by the counter 35 as the digital code CODE having a plurality of bits.

Each of the plurality of switch sections SW is configured to supply the digital code CODE outputted from the AD converter ADC to the bus wiring line BUS on the basis of a control signal SSW supplied from the sensor controller 25. The plurality of switch sections SW is provided corresponding to the plurality of AD converters ADC. Specifically, a 0th switch section SW[0] is provided corresponding to the 0th AD converter ADC[0], a first switch section SW[1] is provided corresponding to the first AD converter ADC[1], and a second switch section SW[2] is provided corresponding to the second AD converter ADC[2].

The switch section SW is configured using the same number of transistors as the number of bits of the digital code CODE in this example. These transistors are controlled to be turned on or off on the basis of respective bits (control signals SSW[0], SSW[1], SSW[2], ... ) of the control signal SSW supplied from the sensor controller 25. Specifically, for example, the 0th switch section SW[0] supplies the digital code CODE outputted from the 0th AD converter ADC[0] to the bus wiring line BUS by turning on the respective transistors on the basis of the control signal SSW[0]. Similarly, for example, the first switch section SW[1] supplies the digital code CODE outputted from the first AD converter ADC[1] to the bus wiring line BUS by turning on the respective transistors on the basis of the control signal SSW[1]. The same applies to other switch sections SW.

The bus wiring line BUS includes a plurality of wiring lines, and is configured to transmit the digital code CODE outputted from the AD converter ADC. The bus wiring line BUS is coupled to the plurality of switch sections SW, and is coupled to the image processor 24. The readout section 30 sequentially transfers a plurality of digital codes CODE supplied from the AD converters ADC as an image signal DATA0 to the image processor 24 with use of the bus wiring line BUS (a data transfer operation).

The image processor 24 is configured to generate the depth image PIC on the basis of the image signal DATA0. Specifically, the image processor 24 performs predetermined calculation processing including, of example, a Fresnel transform on the basis of information about interference fringes on the light reception surface S of the sensor 20 included in the image signal DATA0 to determine phase information INF. The phase information INF includes information about a phase difference, generated by the measurement target 9, between a phase of a light wave in the light pulse L10 and a phase of a light wave in the reflected light pulse L20. The image processor 24 then generates the depth image PIC on the basis of the phase information INF. Each of a plurality of pixel values included in the depth image indicates a value about a depth (a distance). That is, the depth image PIC indicates the three-dimensional shape of the measurement target 9. The image processor 24 then outputs the depth image PIC as the image signal DATA.

The sensor controller 25 (FIG. 2) is configured to control an operation of the sensor 20 by supplying a control signal to the driving section 22, the readout section 30, and the image processor 24 and controlling operations of these circuits. Specifically, the sensor controller 25 supplies a control signal to the driving section 22, for example, thereby performing control to cause the driving section 22 to drive the plurality of pixels P in the pixel array 21. In addition, the sensor controller 25 supplies the reference signal REF, the clock signal CLK, the control signal CC, and the control signal SSW (the control signals SSW[0], SSW[1], SSW[2], . . . ), thereby performing control to cause the readout section 30 to generate the image signal DATA0 on the basis of the pixel signals SIG. In addition, the sensor controller 25 supplies a control signal to the image processor 24 to control an operation of the image processor 24.

The sensor controller 25 includes a reference signal generator 26 as illustrated in FIG. 5. The reference signal generator 26 is configured to generate the reference signal REF. The reference signal REF has a so-called ramp waveform in which a voltage level is gradually decreased over time in two periods (the conversion periods T1 and T2) in which AD conversion is performed. The reference signal generator 26 supplies the generated reference signal REF to the plurality of AD converters ADC of the readout section 30.

The controller 17 (FIG. 1) is configured to control an operation of the measurement device 1 by supplying a control signal to the light source controller 12 and the sensor 20 and controlling operations of these circuits.

Here, the photodiode PD corresponds to a specific example of a "light receiver" in the present disclosure. The floating diffusions FD0 to FD3 correspond to a specific example of a "plurality of storage sections" in the present disclosure. The floating diffusion FD1 corresponds to a specific example of a "first storage section" in the present disclosure. The floating diffusion FD3 corresponds to a specific example of a "second storage section" in the present disclosure. The floating diffusion FD2 corresponds to a specific example of a "third storage section" in the present disclosure. The floating diffusion FD0 corresponds to a specific example of a "fourth storage section" in the present disclosure. The transistors TRG0 to TRG3 correspond to specific examples of a "electric charge supplying section" and a "plurality of transistors" in the present disclosure. The readout section 30 and the image processor 24 correspond to specific examples of a "processor" in the present disclosure. The beam splitter 13, the plane mirror 14, and the beam combiner 15 correspond to specific examples of an "optical system" in the present disclosure.

[Operation and Workings]

Next, description is given of the operation and workings of the measurement device 1 according to the present embodiment.

(Overview of Overall Operation)

First, description is given of an overview of an overall operation of the measurement device 1 with reference to FIGS. 1 to 3. The light source controller 12 (FIG. 1) controls an operation of the light source 11 on the basis of an instruction from the controller 17. The light source 11 performs the light emission operation of alternating between emission and non-emission of light on the basis of an instruction from the light source controller 12 to emit the light pulse L1. The beam splitter 13 splits the incident light pulse L1 into two light pulses L10 and L11. The light pulse L11 outputted from the beam splitter 13 is reflected by the measurement target 9, and enters the beam combiner 15 as the reflected light pulse L20. The plane mirror 14 reflects the light pulse L10 outputted from the beam splitter 13 toward the beam combiner 15. The beam combiner 15 combines the incident light pulse L10 and the incident reflected light pulse L20. The sensor 20 detects interference fringes formed by the light pulse L10 and the reflected light pulse L20 outputted from the beam combiner 15 to generate the depth image PIC. Specifically, the plurality of pixels P in pixel array 21 of the sensor 20 detects light to generate the pixel signals SIG. The readout section 30 performs AD conversion on the basis of the pixel signals SIG supplied from the pixel array 21 to generate the image signal DATA0. The image processor 24 generates the depth image PIC on the basis of the image signal DATA0, and outputs the depth image PIC as the image signal DATA.

(Details of Operation)

The measurement device 1 first performs an exposure operation D1 to store electric charge in four floating diffusions FD0 to FD3 in each of the plurality of pixels P. The measurement device 1 then performs a readout operation D2 to perform AD conversion on the basis of the pixel signals SIG supplied from the plurality of pixels P through the signal lines SGL to generate the image signal DATA0. The measurement device 1 then generates the depth image PIC on the basis of the image signal DATA0. This operation is described in detail below.

FIG. 6 illustrates an example of the exposure operation D1 and the readout operation D2 in the measurement device 1. In FIG. 6, an upper end indicates an uppermost section of the pixel array 21, and a lower end indicates a lowermost section of the pixel array 21.

The measurement device 1 performs the exposure operation D1 in a period from a timing t1 to a timing t2. Specifically, the light source controller 12 controls the operation of the light source 11, and the light source 11 performs the light emission operation of alternating between emission and non-emission of light to emit the light pulse L1. In addition, the driving section 22 drives the plurality of pixels P in the pixel array 21, and the plurality of pixels P receives light of the light pulse L10 and light of the reflected light pulse L20. Thus, the measurement device 1 performs the exposure operation D1 by a so-called global shutter method.

The measurement device 1 then performs the readout operation D2 in a period from the timing t2 to a timing t3. Specifically, the driving section 22 drives the plurality of pixels P in the pixel array 21 sequentially in units of pixel lines L. The plurality of pixels P supplies the pixel signals SIG to the readout section 30 through the signal lines SGL (the signal lines SGL0 and SGL1). The readout section 30 performs AD conversion on the basis of the pixel signals SIG to generate the image signal DATA0.

The image processor 24 generates the depth image PIC on the basis of the image signal DATA0 generated by the readout operation D2. The image processor 24 then outputs the generated depth image PIC as the image signal DATA.

The measurement device 1 then alternates between the exposure operation D1 and the readout operation D2 from the timing t3 onward, as illustrated in FIG. 6.

(About Exposure Operation D1)

Next, the exposure operation D1 in the measurement device 1 is described in detail. In the following, with a focus on a pixel P1 of the plurality of pixels P in the pixel array 21, the exposure operation D1 related to the pixel P1 is described in detail.

FIGS. 7A, 7B, 7C, 7D, 7E, 7F, 7G, and 7H illustrate an example of the exposure operation D1, where FIG. 7A indicates a waveform of the light pulse L1 emitted from the light source 11, FIG. 7B indicates waveforms of the reset control signals SRST0 and SRST2, FIG. 7C indicates waveforms of the reset control signals SRST1, SRST3, and SRST, FIG. 7D indicates waveforms of voltages VFD0 to VFD3 in the floating diffusions FD0 to FD3, FIG. 7E indicates a waveform of the control signal STRG0, FIG. 7F indicates a waveform of the control signal STRG1, FIG. 7G indicates a waveform of the control signal STRG2, and FIG. 7H indicates a waveform of the control signal STRG3.

In the exposure operation D1, the driving section 22 turns the voltages of the selection control signals SSELA and SSELB to a low level. This turns off the transistors SEL0 to SEL3 of the pixel P1. The driving section 22 then generates the control signals STRG0 to STRG3. This turns on or off the transistors TRG0 to TRG3 to cause any one of the transistors TRG0 to TRG3 to be turned on, and electric charge generated by the photodiode PD is selectively stored in the floating diffusions FD0 to FD3. This operation is described in detail below.

In a period before a timing t11, the driving section 22 turns the voltages of the reset control signals SRST0 to SRST3 and SRST to a high level (FIGS. 7B and 7C). This turns on the transistors RST0 to RST3 and RST of the pixel P1, the voltage VRST is supplied to the floating diffusions FD0 to FD3, and the voltage VRSTX is supplied to the cathode of the photodiode PD. Thus, the voltages VFD0 to VFD3 of the floating diffusions FD0 to FD3 are set to a voltage V1 corresponding to the voltage VRST ((D) FIG. 7D).

Next, at the timing t11, the driving section 22 changes the voltages of the reset control signals SRST0 to SRST3 and SRST from the high level to the low level (FIGS. 7B and 7C). This turns off the transistors RST0 to RST3 and RST of the pixel P1.

In addition, the light source 11 starts the light emission operation of alternating between emission and non-emission of light at the timing t11 (FIG. 7A). Specifically, the light source 11 is turned to a light emission state in a period from the timing t11 to a timing t13, and is turned to a non-light emission state in a period from the timing t13 to a timing t15. A light emission duty ratio of the light pulse L1 is 50% in this example. That is, the length of a light emission period (from the timing t11 to the timing t13) and the length of a non-light emission period (from the timing t13 to the timing t15) are equal to each other. The light source 11 repeats the operation from the timing t11 to the timing t15.

In addition, the driving section 22 starts to selectively and sequentially turn the control signals STRG0 to STRG3 to the high level at the timing t11 (FIGS. 7E, 7F, 7G, and 7H). Specifically, the driving section 22 turns the control signal STRG0 to the high level in a period from the timing t11 to a timing t12, turns to the control signal STRG1 to the high level in a period from the timing t12 to the timing t13, turns the control signal STRG2 to the high level in a period from the timing t13 to a timing t14, and turns the control signal STRG3 to the high level in a period from the timing t14 to the timing t15. A duty ratio of the control signals STRG0 to STRG3 is 25% in this example. That is, pulse widths of the control signals STRG0 to STRG3 are equal to one another. The driving section 22 repeats this operation from the timing t11 to the timing t15.

As illustrated in FIGS. 7A, 7E, 7F, 7G, and 7H, frequencies of the control signals STRG0 to STRG3 are equal to a frequency of the light emission operation of the light source 11, and the control signals STRG0 to STRG3 are synchronized with the light emission operation of the light source 11. That is, the controller 17 supplies a control signal to the sensor controller 25 of the sensor 20, and the sensor controller 25 instructs the driving section 22 to generate the control signals STRG0 to STRG3. In addition, the controller 17 supplies a control signal to the light source controller 12, and the light source controller 12 instructs the light source 11 to start the light emission operation of alternating between emission and non-emission of light. This makes it possible to synchronize the control signal STRG0 to STRG3 with the light emission operation of the light source 11 in the measurement device 1.

Thus, an exposure period TE starts at the timing t11. In the exposure period TE, the photodiode PD generates electric charge on the basis of background light L0 incident on the measurement device 1, the light pulse L10, and the reflected light pulse L20. The transistor TRG0 is turned on or off on the basis of the control signal STRG0, the transistor TRG1 is turned on or off on the basis of the control signal STRG1, the transistor TRG2 is turned on or off on the basis of the control signal STRG2, and the transistor TRG3 is turned on or off on the basis of the control signal STRG3. That is, any one of the transistors TRG0 to TRG3 is turned on. Thus, electric charge generated by the photodiode PD is selectively stored in the floating diffusions FD0 to FD3.

FIGS. 8A, 8B, 8C, 8D, 8E, 8F, 8G, 8H, 8I, 8J, and 8K illustrate an example of an electric charge storing operation in the floating diffusions FD0 to FD3, where FIG. 8A indicates the background light L0 incident on the measurement device 1, FIG. 8B indicates the waveform of the light pulse L10, FIG. 8C indicates the waveform of the reflected light pulse L20, FIGS. 8D, 8E, 8F, and 8G respectively indicate waveforms of the control signals STRG0 to STRG3, and FIGS. 8H, 8I, 8J, and 8K respectively indicate electric charge Q0 to Q3 stored in the floating diffusions FD0 to FD3.

First, the light pulse L10 rises at a timing t21, and falls at a timing t24 (FIG. 8B). The light pulse L10 corresponds to the light pulse L1 illustrated in FIG. 7A.

In addition, the control signal STRG0 rises at the timing t21, and falls at a timing t23 delayed by a phase of 90 degrees from the timing t21 (FIG. 8D). The control signal STRG1 rises at the timing t23, and falls at a timing t24 delayed by a phase of 90 degrees from the timing t23 (FIG. 8E). The control signal STRG2 rises at the timing t24, and falls at a timing t26 delayed by a phase of 90 degrees from the timing t24 (FIG. 8F). The control signal STRG3 rises at the timing t26, and falls at a timing t27 delayed by a phase of 90 degrees from the timing t26 (FIG. 8G). Thus, the control signals STRG0 to STRG3 are synchronized with the light pulse L10.

The phase of the reflected light pulse L20 is shifted by a phase φ from the phase of the light pulse L10 (FIG. 8C). The phase φ corresponds to a light path difference between a light path reaching the sensor 20 from the beam splitter 13 via the plane mirror 14 and a light path reaching the sensor 20 from the beam splitter 13 via the measurement target 9. In this example, the reflected light pulse L20 rises at the timing t22 delayed by a time corresponding to the phase φ from the timing t21, and the reflected light pulse L20 falls at the timing t25 delayed by the time corresponding to the phase cp from the timing t24.

The photodiode PD of the pixel P1 detects the background light L0 and light of the light pulse L10, and generates electric charge on the basis of the detected light in a period from the timing t21 to the timing t22 as illustrated in FIGS. 8A, 8B, and 8C. In addition, the photodiode PD detects the background light L0 and interfering light between the light pulse L10 and the reflected light pulse L20, and generates electric charge on the basis of the detected light in a period from the timing t22 to the timing t24. In addition, the photodiode PD detects the background light L0 and light of the reflected light pulse L20, and generates electric charge on the basis of the detected light in a period from the timing t24 to the timing t25. In addition, the photodiode PD detects the background light L0, and generates electric charge on the basis of the detected light in a period from the timing t25 to the timing t27.

The transistor TRG0 transfers electric charge generated by the photodiode PD to the floating diffusion FD0 in a period from the timing t21 to the timing t23 in which the control signal STRG0 is in the high level (FIG. 8D). Thus, electric charge based on the background light L0, the light pulse L10, and the reflected light pulse L20 is stored in the floating diffusion FD0 in a period from the timing t21 to the timing t23 (FIG. 8H). This electric charge Q0 may be represented by the following expression.

$Q0=Ir[\varphi]+In[90]-In[\varphi]+Am[90]$

Here, $Ir[\varphi]$ indicates electric charge in the phase $\varphi$ related to the light pulse L10, which is stored in the period from the timing t21 to the timing t22, $In[90]-In[\varphi]$ indicates electric charge in a phase of $(90-\varphi)$ degrees related to the interfering light between the light pulse L10 and the reflected light pulse L20, which is stored in a period from the timing t22 to the timing t23, and $Am[90]$ indicates electric charge corresponding to a phase of 90 degrees related to the background light L0, which is stored in a period from the timing t21 to the timing t23.

The transistor TRG1 transfers electric charge generated by the photodiode to the floating diffusion FD1 in a period from the timing t23 to the timing t24 in which the control signal STRG1 is in the high level (FIG. 8E). Thus, electric charge based on the background light L0, the light pulse L10, and the reflected light pulse L20 is stored in the floating diffusion FD1 in a period from the timing t23 to the timing t24 (FIG. 8I). This electric charge Q1 may be represented by the following expression.

$Q1=In[90]+Am[90]$

Here, $In[90]$ indicates electric charge corresponding to a phase of 90 degrees related to interfering light between the light pulse L10 and the reflected light pulse L20, which is stored in a period from the timing t23 to the timing t24, and $Am[90]$ indicates electric charge corresponding to a phase of 90 degrees related to the background light L0, which is stored in a period from the timing t23 to the timing t24.

The transistor TRG2 transfers electric charge generated by the photodiode to the floating diffusion FD2 in a period from the timing t24 to the timing t26 in which the control signal STRG2 is in the high level (FIG. 8F). Thus, electric charge based on the background light L0 and the reflected light pulse L20 is stored in the floating diffusion FD2 in a period from the timing t24 to the timing t26 (FIG. 8J). This electric charge Q2 may be represented by the following expression.

$Q2=Re[\varphi]+Am[90]$

Here, $Re[\varphi]$ indicates electric charge in the phase $\varphi$ related to interfering light of the reflected light pulse L20, which is stored in a period from the timing t24 to the timing t25, and $Am[90]$ indicates electric charge corresponding to a phase of 90 degrees related to the background light L0, which is stored in a period from the timing t24 to the timing t26.

The transistor TRG3 transfers electric charge generated by the photodiode to the floating diffusion FD3 in a period from the timing t26 to the timing t27 in which the control signal STRG3 is in the high level (FIG. 8G). Thus, electric charge based on the background light L0 is stored in the floating diffusion FD3 in a period from the timing t26 to the timing t27 (FIG. 8K). This electric charge Q3 may be represented by the following expression.

$Q3=Am[90]$ $Q3=Am[90]$

Here, $Am[90]$ indicates electric charge corresponding to a phase of 90 degrees related to the background light L0, which is stored in a period from the timing t26 to the timing t27.

A difference between the electric charge Q1 and the electric charge Q3 may be represented by the following expression.

$Q1-Q3=In[90]+Am[90]-Am[90]=In[90]$

That is, $Am[90]$, which is electric charge corresponding to a phase of 90 degrees related to the background light L0, is canceled out, and $In[90]$, which is electric charge corresponding to a phase of 90 degrees related to interfering light between the light pulse L10 and the reflected light pulse L20, remains. As described later, the measurement device 1 obtains a pixel value VAL (to be described later) corresponding to the electric charge $In[90]$ in all the pixels P in the pixel array 21. That is, the electric charge $In[90]$ is generated corresponding to the interfering light between the light pulse L10 and the reflected light pulse L20, which allows the measurement device 1 to obtain information about interference fringes on the basis of the pixel value VAL corresponding to the electric charge $In[90]$ in all the pixels P in the pixel array 21.

The pixel P1 repeats the operation from the timing t21 to the timing t27 illustrated in FIGS. 8A, 8B, 8C, 8D, 8E, 8F, 8G, 8H, 8I, 8J, and 8K. Thus, the electric charge Q0 is repeatedly stored in the floating diffusion FD0, the electric charge Q1 is repeatedly stored in the floating diffusion FD1, the electric charge Q2 is repeatedly stored in the floating diffusion FD2, and the electric charge Q3 is repeatedly stored in the floating diffusion FD3. Accordingly, the voltages VFD0 to VFD3 of the floating diffusions FD0 to FD3 are gradually decreased (FIG. 7D). A voltage change amount in the voltage VFD0 corresponds to the electric charge Q0. A voltage change amount in the voltage VFD1 corresponds to the electric charge Q1. A voltage change amount in the voltage VFD2 corresponds to the electric charge Q2. A voltage change amount in the voltage VFD3 corresponds to the electric charge Q3.

As illustrated in FIGS. 7A, 7B, 7C, 7D, 7E, 7F, 7G, and 7H, the light source 11 then ends the light emission operation at a timing t16 (FIG. 7A). In addition, the driving section 22 sets the control signals STRG0 to STRG3 to the low level at the timing t16. This turns off the transistors TRG0 to TRG3. As a result, the photodiode PD and floating diffusions FD0 to FD3 are electrically disconnected from then on. Thus, the exposure period TE ends at the timing t16.

The driving section 22 then changes the voltages of the reset control signals SRST0 and SRST2 from the low level to the high level at a timing t17 (FIG. 7B). This turns on the transistors RST0 and RST2 of the pixel P, and the voltages VFD0 and VFD2 of the floating diffusions FD0 and FD2 are set to the voltage V1 corresponding to the voltage VRST (FIG. 7D). Thus, the electric charge stored in the floating diffusions FD0 and FD2 is discharged. "Q0=0" and "Q3=0" in FIGS. 8A, 8B, 8C, 8D, 8E, 8F, 8G, 8H, 8I, 8J, and 8K indicate that electric charge stored in the floating diffusions FD0 and FD2 is discharged. The driving section 22 then changes the voltages of the reset control signals SRST0 and SRST2 from the high level to the low level at a timina t18. This turns off the transistors RST0 and RST2 of the pixel P.

Meanwhile, the reset control signals SRST1 and SRST3 are kept at the low level in a period from the timing t17 to the timing t18, which keeps the transistors RST1 and RST3 of the pixel P1 off; therefore, the voltages VFD1 and VFD3 of the floating diffusions FD1 and FD3 are maintained (FIGS. 7C and 7D).

Thereafter, the measurement device 1 then performs the readout operation D2 to be described below.

(Readout Operation D2)

Next, the readout operation D2 in the measurement device 1 is described in detail. An operation of reading the pixel signal SIG related to the floating diffusion FD1 in the pixel P is described below as an example.

FIGS. 9A, 9B, 9C, 9D, 9E, 9F, and 9G illustrate an example of the readout operation D2, where FIG. 9A indicates a waveform of the selection control signal SSELA, FIG. 9B indicates a waveform of the reset control signal SRST1, FIG. 9C indicates a waveform of the reference signal REF, FIG. 9D indicates a waveform of the pixel signal SIG, FIG. 9E indicates a waveform of the signal CMP outputted from the comparator 34 of the AD converter ADC, FIG. 9F indicates a waveform of the clock signal CLK, and FIG. 9G indicates the count value CNT in the counter 35 of the AD converter ADC. Here, FIGS. 9C and 9D, waveforms of respective signals are represented on the same voltage axis. The reference signal REF in FIG. 9C indicates a waveform at the positive input terminal of the comparator 34, and the pixel signal SIG in FIG. 9D indicates a waveform at the negative input terminal of the comparator 34.

In this readout operation D2, the driving section 22 turns the voltage of the selection control signal SSELA to the high level, and turns the voltage of the selection control signal SSELB to the low level. This turns on the transistors SEL0 and SEL1, and turns off the transistors SEL2 and SEL3. Accordingly, the pixel P1 supplies a voltage corresponding to the voltage VFD0 of the floating diffusion FD0 to the readout section 30 through the signal line SGL0, and supplies a voltage corresponding to the voltage VFD1 of the floating diffusion FD1 to the readout section 30 through the signal line SGL1. The AD converter ADC of the readout section 30 then performs AD conversion on the basis of the pixel signal SIG outputted by the pixel P1 in the conversion period T1. The driving section 22 then performs a reset operation on the floating diffusions FD0 and FD1, and the AD converter ADC performs AD conversion on the basis of the pixel signal SIG outputted by the pixel P1 in the conversion period T2. This operation is described in detail below. It is to be noted that in the following description, an operation related to the floating diffusion FD1 is described as an example, but the same applies to operations related to the floating diffusions FD0, FD2, and FD3.

First, the driving section 22 changes the voltage of the selection control signal SSELA from the low level to the high level at a timing t31 (FIG. 9A). In the pixel P1, this turns on the transistors SEL0 and SEL1, and the pixel P is electrically coupled to the signal lines SGL0 and SGL1. Accordingly, the pixel P1 supplies, as the pixel signal SIG, a voltage corresponding to the voltage VFD1 of the floating diffusion FD1 to the readout section 30 through the signal line SGL1.

Next, the AD converter ADC coupled to the signal line SGL1 performs AD conversion on the basis of the pixel signal SIG in a period from a timing t32 to a timing t34 (the conversion period T1). Specifically, at the timing t32, the sensor controller 25 starts generation of the clock signal CLK (FIG. 9F), and simultaneously with this, the reference signal generator 26 starts to decrease the voltage of the reference signal REF from a voltage V2 by a predetermined change degree (FIG. 9C). In response to this, the counter 35 of the AD converter ADC starts a count operation to degrease the count value CNT from "0" (FIG. 9G).

The voltage of the reference signal REF then falls below the voltage of the pixel signal SIG at a timing t33 (FIGS. 9C and 9D). In response to this, the comparator 34 of the AD converter ADC changes the voltage of the signal CMP from the high level to the low level (FIG. 9E), and as a result, the counter 35 stops the count operation (FIG. 9G). The count value CNT at this time is a negative value of "−CNT1".

Next, the sensor controller 25 stops generation of the clock signal CLK with the end of the conversion period T1 at the timing t34 (FIG. 9F). Simultaneously with this, the reference signal generator 26 stops change of the voltage of the reference signal REF, and changes the voltage of the reference signal REF to the voltage V2 at a subsequent timing t35 (FIG. 9C). Accordingly, the voltage of the reference signal REF exceeds the voltage of the pixel signal SIG (FIGS. 9C and 9D); therefore, the comparator 34 of the AD converter ADC changes the voltage of the signal CMP from the low level to the high level (FIG. 9E).

Next, the counter 35 of the AD converter ADC reverses the polarity of the count value CNT on the basis of the control signal CC at a timing t36 (FIG. 9G). This changes the count value CNT to a positive value of "CNT1".

Next, the driving section 22 changes the voltage of the reset control signal SRST1 from the low level to the high level at a timing t37 (FIG. 9B). In the pixel P1, this turns on the transistor RST1, and the voltage VRST is supplied to the floating diffusion FD1 (a reset operation). Thus, the voltage of the pixel signal SIG is increased toward the voltage V1 corresponding to the voltage VRST.

Next, the driving section 22 changes the voltage of the reset control signal SRST1 from the high level to the low level at a timing t38 (FIG. 9B). Thus, in the pixel P1, this turns off the transistor RST1.

Next, the AD converter ADC performs AD conversion on the basis of the pixel signal SIG in a period from a timing t39 to a timing t41 (the conversion period T2). Specifically, the sensor controller 25 starts generation of the clock signal CLK at the timing t39 (FIG. 9F), and simultaneously with this, the reference signal generator 26 starts to decrease the voltage of the reference signal REF from the voltage V2 by a predetermined change degree (FIG. 9C). In response to this, the counter 35 of the AD converter ADC starts the count operation to decrease the count value (FIG. 9).

The voltage of the reference signal REF then falls below the voltage of the pixel signal SIG at a timing t40 (FIGS. 9C and 9D). In response to this, the comparator 34 of the AD converter ADC changes the voltage of the signal CMP from the high level to the low level (FIG. 9E), and as a result, the counter 35 stops the count operation (FIG. 9G). The count value CNT is decreased by a count value CNT2 in a period from the timing t39 to the timing t40. The latch 36 of the AD converter ADC then outputs the count value CNT (CNT1−CNT2) in the counter 35 as the digital code CODE (a digital code CODE1).

Next, the sensor controller 25 stops generation of the clock signal CLK with the end of the conversion period T2 at the timing t41 (FIG. 9F). Simultaneously with this, the reference signal generator 26 stops change of the voltage of the reference signal REF, and changes the voltage of the reference signal REF to the voltage V2 at a subsequent timing t42 (FIG. 9C). Accordingly, the voltage of the reference signal REF exceeds the voltage of the pixel signal SIG (FIGS. 9C and 9D), and the comparator 34 of the AD converter ADC changes the voltage of the signal CMP from the low level to the high level (FIG. 9E).

At a timing t43, the driving section 22 then changes the voltage of the selection control signal SSELA from the high level to the low level (FIG. 9A). In the pixel P1, this turns off the transistors SEL0 and SEL1, and the pixel P1 is electrically separated from the signal lines SGL0 and SGL1.

Thus, in the measurement device 1, the count operation is performed on the basis of the pixel signal SIG supplied from the pixel P1 in the conversion period T1 to reverse the polarity of the count value CNT. In the measurement device 1, the floating diffusion FD1 of the pixel P1 is then reset, and the count operation is performed on the basis of the pixel signal SIG supplied from the pixel P1 in the conversion period T2. In the measurement device 1, such so-called double data sampling (DDS) is performed, which makes it possible to remove a noise component included in the pixel signal SIG, and consequently enhance depth (distance) measurement accuracy, for example.

The readout section 30 reads the pixel signal SIG related to the floating diffusion FD1 in the pixel P1 in such a manner, thereby generating the digital code CODE (the digital code CODE1). Similarly, the readout section 30 reads the pixel signal SIG related to the floating diffusion FD0, thereby generating the digital code CODE (a digital code CODE0), reads the pixel signal SIG related to the floating diffusion FD2, thereby generating the digital code CODE (a digital code CODE2), and reads the pixel signal SIG related to the floating diffusion FD3, thereby generating the digital code CODE (a digital code CODE3).

The digital code CODE1 is a code corresponding to the electric charge Q1, and the digital code CODE3 is a code corresponding to the electric charge Q3. Meanwhile, values of the digital codes CODE0 and CODE2 are about "0". That is, electric charge stored in the floating diffusions FD0 and FD2 has been already discharged in the period from the timing t17 to the timing t18 before the readout operation D2 as illustrated in FIGS. 7A, 7B, 7C, 7D, 7E, 7F, 7G, and 7H; therefore, the values of the digital codes CODE0 and CODE2 are about "0".

The readout section 30 then supplies the image signal DATA0 including these digital codes CODE0 to CODE3 to the image processor 24.

The image processor 24 generates the depth image PIC on the basis of the image signal DATA0. Specifically, the image processor 24 determines a difference (CODE1–CODE3) between the digital code CODE1 and the digital code CODE3 on the basis of four digital codes CODE0 to CODE3 related to each of the plurality of pixels P and included in the image signal DATA0 to determine a pixel value VAL of the pixel P. That is, the digital code CODE1 includes an interfering light component and a background light component, and the digital code CODE3 includes the background light component; therefore, determining a difference (CODE1–CODE3) between the digital code CODE1 and the digital code CODE3 makes it possible to determine the interfering light component. The pixel values VAL of all the pixel P in the pixel array 21 include information about interference fringes on the light reception surface S of the sensor 20. The image processor 24 performs predetermined calculation processing including, for example, a Fresnel transform on the basis of information about the interference fringes to determine phase information INF. The image processor 24 then generates the depth image PIC on the basis of the phase information INF.

Here, the exposure period TE corresponds to a specific example of a "first period" in the present disclosure. The period from the timing t23 to the timing t24 corresponds to a specific example of a "second period" in the present disclosure. The period from the timing t26 to the timing t27 corresponds to a specific example of a "third period" in the present disclosure. The pixel value VAL corresponds to a specific example of a "first pixel value" in the present disclosure.

As described above, in the measurement device 1, the light source 11 performs the light emission operation of alternating between emission and non-emission of light, and electric charge generated by the photodiode PD is selectively stored in the floating diffusions FD0 to FD3. The depth image PIC is then determined on the basis of a difference between the digital code CODE1 related to the floating diffusion FD1 and the digital code CODE3 related to the floating diffusion FD3. This makes it possible to effectively remove the background light component included in the digital code CODE1 in the measurement device 1. This consequently makes it possible to enhance depth (distance) measurement accuracy.

That is, for example, in a case where the background light is detected in advance and the background light component included in detected light in detection of interference fringes is removed with use of a result of detection of the background light, the background light component may not be sufficiently removed. That is, in a case where a period in which the background light is detected and a period in which the interfering light is detected are separated from each other, the background light may change due to air density fluctuations, movement of the measurement target 9, and the like, for example. In this case, it is not possible to effectively remove the background light component included in detected light in detection of interference fringes.

In contrast, in the measurement device 1, electric charge generated by the photodiode PD is selectively stored in the floating diffusions FD0 to FD3. This makes it possible to store the electric charge Q1 based on interfering light and the background light L0 in the floating diffusion FD1, for example, in a period from the timing t23 to the timing t24 in FIGS. 8A, 8B, 8C, 8D, 8E, 8F, 8G, 8H, 8I, 8J, and 8K, and store the electric charge Q3 based on the background light L0 in the floating diffusion FD3, for example, in a period from the timing t26 to the timing t27 in FIGS. 8A, 8B, 8C, 8D, 8E, 8F, 8G, 8H, 8I, 8J, and 8K. That is, in the measurement device 1, it is possible to perform detection of the interfering light and the background light L0 and detection of the background light L0 in parallel in a time-divisional manner. In the measurement device 1, a difference between the digital code CODE1 related to the floating diffusion FD1 and the digital code CODE3 related to the floating diffusion FD3 is then determined. This makes it possible to effectively remove the background light component included in the digital code CODE1. This consequently makes it possible to enhance depth (distance) measurement accuracy in the measurement device 1.

(About Captured Image PIC2)

Although generation of the depth image PIC has been described above, the measurement device 1 is allowed to generate a captured image PIC2 in addition to the depth image PIC. This operation is described below.

FIGS. 10A, 10B, 10C, 10D, 10E, 10F, 10G, and 10H illustrate an example of an exposure operation in a case where the captured image PIC2 is generated, where FIG. 10A indicates the waveform of the light pulse L1 emitted from the light source 11, FIG. 10B indicates waveforms of the reset control signals SRST0 and SRST1, FIG. 10C indicates waveforms of the reset control signals SRST2, SRST3, and SRST, FIG. 10D indicates waveforms of the voltages VFD0 to VFD3 in the floating diffusions FD0 to FD3, FIG. 10E indicates the waveform of the control signal STRG0, FIG. 10F indicates the waveform of the control signal STRG1, FIG. 10G indicates the waveform of the control signal STRG2, and FIG. 10H indicates the waveform of the control signal STRG3.

Similarly to a case where the depth image PIC is generated (FIGS. 7A 7B, 7C, 7D, 7E, 7F, 7G, and 7H), in a period before a timing t51, the driving section 22 turns the voltages of the reset control signal SRST0 to SRST3 and SRST to the high level (FIGS. 10B and 10C). This turns on the transistors RST0 to RST3 and RST of the pixel P1, and the voltage VRST is supplied to the floating diffusion FD0 to FD3, and the voltage VRSTX is supplied to the cathode of the photodiode PD. Thus, the voltages VFD0 to VFD3 of the floating diffusions FD0 to FD3 are set to the voltage V1 corresponding to the voltage VRST (FIG. 10D).

Next, at the timing t51, the driving section 22 changes the voltages of the reset control signals SRST0 to SRST3 and SRST from the high level to the low level (FIGS. 10B and 10C). This turns off the transistors RST0 to RST3 and RST of the pixel P1. In addition, the light source 11 starts the light emission operation of alternating between emission and non-emission of light at the timing t51 (FIG. 10A). In addition, the driving section 22 starts to selectively and sequentially turn the control signals STRG0 to STRG3 to the high level at the timing t51 (FIGS. 10E, 10F, 10G, and 10H).

Thus, the exposure period TE starts at the timing t51. In the exposure period TE, the photodiode PD generates electric charge on the basis of the background light L0 incident on the measurement device 1, the light pulse L10, and the reflected light pulse L20. The electric charge generated by the photodiode PD is then stored selectively in the floating diffusions FD0 to FD3.

FIGS. 11A, 11B, 11C, 11D, 11E, 11F, 11G, 11H, 11I, 11J, and 11K illustrate an example of an electric charge storing operation in the floating diffusions FD0 to FD3 in the case where the capture image PIC2 is generated. The electric charge storing operation is similar to the operation in the case where the depth image PIC is generated (FIGS. 8A, 8B, 8C, 8D, 8E, 8F, 8G, 8H, 8I, 8J, and 8K).

A difference between the electric charge Q2 and the electric charge Q3 may be represented by the following expression.

$$Q2-Q3=Re[\varphi]+Am[90]-Am[90]=Re[\varphi]$$

That is, Am[90], which is electric charge corresponding to a phase of 90 degrees related to the background light L0, is canceled out, and Re[φ], which is electric charge in the phase φ related to the reflected light pulse L20, remains. As described later, the measurement device 1 obtains a pixel value VAL2 (to be described later) corresponding to the electric charge Re[φ] in all the pixel P in the pixel array 21. That is, the electric charge Re[φ] is generated corresponding to the reflected light pulse L20, which allows the measurement device 1 to obtain the captured image PIC2 on the basis of the pixel value VAL2 corresponding to the electric charge Re[φ] in all the pixels P in the pixel array 21.

The pixel P1 repeats the operation from a timing t61 to the timing t67 illustrated in FIGS. 11A, 11B, 11C, 11D, 11E, 11F, 11G, 11H, 11I, 11J, and 11K. Thus, the electric charge Q0 is repeatedly stored in the floating diffusion FD0, the electric charge Q1 is repeatedly stored in the floating diffusion FD1, the electric charge Q2 is repeatedly stored in the floating diffusion FD2, and the electric charge Q3 is repeatedly stored in the floating diffusion FD3. Accordingly, the voltages VFD0 to VFD3 of the floating diffusions FD0 to FD3 are gradually decreased (FIG. 10D).

As illustrated in FIGS. 10A, 10B, 10C, 10D, 10E, 10F, 10G, and 10H, the light source 11 then ends the light emission operation at a timing t56 (FIG. 10A). In addition, the driving section 22 sets the control signals STRG0 to STRG3 to the low level at the timing t56. Thus, the exposure period TE ends at the timing t56.

At a timing t57, the driving section 22 then changes the voltages of the reset control signals SRST0 and SRST1 from the low level to the high level (FIG. 10B). This turns on the transistors RST0 and RST1 of the pixel P1, and the voltages VFD0 and VFD2 of the floating diffusions FD0 and FD1 are set to the voltage V1 corresponding to the voltage VRST (FIG. 10D). Thus, the electric charge stored in the floating diffusions FD0 and FD1 is discharged. "Q0=0" and "Q1=0" in FIGS. 11A, 11B, 11C, 11D, 11E, 11F, 11G, 11H, 11I, 11J, and 11K indicate that electric charge stored in the floating diffusions FD0 and FD1 is discharged. The driving section 22 then changes the voltages of the reset control signals SRST0 and SRST1 from the high level to the low level at a timing t58. This turns off the transistors RST0 and RST1 of the pixel P.

Thereafter, the measurement device 1 then performs the readout operation D2 similarly to the case where the depth image PIC is generated. The readout section 30 reads the pixel signals SIG related to the floating diffusions FD0 to FD3 in the pixel P1 to generate the digital codes CODE0 to CODE3. The digital code CODE2 is a code corresponding to the electric charge Q2, and the digital code CODE3 is a code corresponding to the electric charge Q3. Meanwhile, the values of the digital codes CODE0 and CODE1 are about "0". That is, the electric charge stored in the floating diffusions FD0 and FD1 has been already discharged in the period from the timing t57 to the timing t58 before the readout operation D2 as illustrated in FIGS. 10A 10B, 10C, 10D, 10E, 10F, 10G, and 10H; therefore, the values of the digital codes CODE0 and CODE1 are about "0". The readout section 30 supplies the image signal DATA0 including these digital codes CODE0 to CODE3 to the image processor 24.

The image processor 24 generates the captured image PIC2 on the basis of the image signal DATA0. Specifically, the image processor 24 determines a difference (CODE2−CODE3) between the digital code CODE2 and the digital code CODE3 on the basis of four digital codes CODE0 to CODE3 related to each of the plurality of pixels P and included in the image signal DATA0 to determine the pixel value VAL2 of the pixel P. That is, the digital code CODE2 includes a reflected light component and a background light component, and the digital code CODE3 includes the background light component; therefore, determining a difference (CODE1−CODE3) between the digital code CODE1 and the digital code CODE3 makes it possible to determine the reflected light component. Accordingly, the pixel values VAL2 of all the pixel P in the pixel array 21 configure the capture image PIC2. The image processor 24 generates the captured image PIC2 in such a manner.

Here, a period from a timing t66 to the timing t67 corresponds to a specific example of a "third period" in the present disclosure. The period from a timing t64 to the period t66 corresponds to a specific example of a "fourth period" in the present disclosure. The pixel value VAL2 corresponds to a specific example of a "second pixel value" in the present disclosure.

As described above, in the measurement device 1, the light source 11 performs the light emission operation of alternating between emission and non-emission of light, and an electric charge generated by the photodiode PD is selectively stored in the floating diffusions FD0 to FD3. The captured image PIC2 is then generated on the basis of a difference between the digital code CODE2 related to the floating diffusion FD2 and the digital code CODE3 related to the floating diffusion FD3. This makes it possible to effectively remove the background light component included in the digital code CODE2 in the measurement device 1. This consequently makes it possible to enhance image quality of the captured image PIC2 in the measurement device 1.

[Effects]

As described above, in the present embodiment, the light source performs the light emission operation of alternating between emission and non-emission of light, and electric charge generated by the photodiode is selectively stored in the plurality of floating diffusions FD0 to FD3. A depth image is then determined on the basis of a difference between the digital code CODE1 related to the floating diffusion FD1 and the digital code CODE3 related to the floating diffusion FD3. This makes it possible to enhance measurement accuracy.

In the present embodiment, the light source performs the light emission operation of alternating between emission and non-emission of light, and electric charge generated by the photodiode is selectively stored in the plurality of floating diffusion FD0 to FD3. A captured image is then generated on the basis of a difference between the digital code CODE2 related to the floating diffusion FD2 and the digital code CODE3 related to the floating diffusion FD3. This makes it possible to enhance image quality of the captured image.

2. Second Embodiment

Next, a measurement device 2 according to a second embodiment is described below. The present embodiment differs from the above-described first embodiment in a method of selectively storing electric charge generated by photoelectric conversion in the plurality of floating diffusions FD0 to FD3. It is to be noted that the components substantially the same as those of the measurement device 1 according to the above-described first embodiment are denoted by the same reference numerals, and descriptions thereof are omitted as appropriate.

As illustrated in FIG. 1, the measurement device 2 includes a sensor 40. As illustrated in FIG. 2, the sensor 40 includes a pixel array 41 and a driving section 42.

FIG. 12 illustrates a configuration example of a pixel Q of the pixel array 41. The pixel array 41 includes a plurality of control lines GUL0, a plurality of control lines GUL1, a plurality of control lines GUL2, a plurality of control lines GUL3, the plurality of selection control lines SELLA, the plurality of selection control lines SELLB, the plurality of reset control lines RSTL0, the plurality of reset control lines RSTL1, the plurality of reset control lines RSTL2, the plurality of reset control lines RSTL3, the plurality of signal lines SGL0, and the plurality of signal lines SGL1. The control lines GUL0, GUL1, GUL2, and GUL3 extend in the horizontal direction (the transverse direction in FIGS. 2 and 12). A control signal SGU0 is applied to the control lines GUL0 by the driving section 42. A control signal SGU1 is applied to the control lines GUL1 by the driving section 42. A control signal SGU2 is applied to the control lines GUL2 by the driving section 42. A control signal SGU3 is applied to the control lines GUL3 by the driving section 42. Pixels Q in one row configures a pixel line L.

The pixel Q includes a photoelectric converter 51, an electric charge partitioning section 50, the floating diffusions FD0, FD1, FD2, and FD3, the transistors RST0, RST1, RST2, and RST3, the transistors AMP0, AMP1, AMP2, and AMP3, and the transistors SEL0, SEL1, SEL2, and SEL3.

The photoelectric converter 51 is configured to generate electric charge corresponding to an amount of received light. The photoelectric converter 51 has one end coupled to the electric charge partitioning section 50, and another end grounded.

The electric charge partitioning section 50 is configured to distribute electric charge generated by the photoelectric converter 51 into four floating diffusions FD0 to FD3. The electric charge partitioning section 50 equivalently includes four switches S0 to S3. The switch S0 has one end coupled to the photoelectric converter 51, and another end coupled to the floating diffusion FD0, the source of the transistor RST0, and the gate of the transistor AMP0. The switch S1 has one end coupled to the photoelectric converter 51, and another end coupled to the floating diffusion FD1, the source of the transistor RST1, and the gate of the transistor AMP1. The switch S2 has one end coupled to the photoelectric converter 51, and another end coupled to the floating diffusion FD2, the source of the transistor RST2, and the gate of the transistor AMP2. The switch S3 has one end coupled to the photoelectric converter 51, and another end coupled to the floating diffusion FD3, the source of the transistor RST3, and the gate of the transistor AMP3. These switches S0 to S3 operate on the basis of a combination of voltages of the control signal SGU0 to SGU3 in the control lines GUL0 to GUL3.

FIGS. 13A and 13B schematically illustrate a configuration example of the electric charge partitioning section 50, where FIG. 13A illustrates one operation state of the electric charge partitioning section 50, and FIG. 13B illustrates another operation state of the electric charge partitioning section 50. A substrate 200P is a P-type semiconductor substrate. The electric charge partitioning section 50 includes diffusion layers 201P, 202N, 211P, and 212N. The diffusion layer 201P is a P-type semiconductor layer formed on a surface of the substrate 200P. The diffusion layer 201P is coupled to the control lines GUL0, and the control signal SGU0 is applied to the diffusion layer 201P. The diffusion layer 202N is an N-type semiconductor layer formed on the surface of the substrate 200P. The diffusion layer 202N is coupled to the floating diffusion FD0, the source of the transistor RST0, and the gate of the transistor AMP0. The diffusion layer 211P is a P-type semiconductor layer formed on the surface of the substrate 200P. The diffusion layer 211P is coupled to the control line GUL1, and the control signal SGU1 is applied to the diffusion layer 211P. The diffusion layer 212N is an N-type semiconductor layer formed on the surface of the substrate 200P. The diffusion layer 212N is coupled to the floating diffusion FD1, the source of the transistor RST1, and the gate of the transistor AMP1.

As illustrated in FIG. 13A, for example, in a case where a positive voltage VP is applied to the diffusion layer 201P and a negative voltage VM is applied to the diffusion layer 211P, an electric field corresponding to these voltages VP and VM is generated in the substrate 200P. In FIG. 13A, a line of electric force is illustrated. Electrons generated by the photoelectric converter 51 then move toward the diffusion layer 202N in accordance with the electric field, and are stored in the floating diffusion FD0 through the diffusion layer 202N. This operation corresponds to an operation in a case where the switch S0 illustrated in FIG. 12 is turned on and the switches S1 to S3 are turned off.

In addition, as illustrated in FIG. 13B, for example, in a case where the negative voltage VM is applied to the diffusion layer 201P and the positive voltage VP is applied to the diffusion layer 211P, an electric field corresponding to these voltages VP and VM is generated in the substrate 200P. Electrons generated by the photoelectric converter 51 then move toward the diffusion layer 212N in accordance with the electric field, and are stored in the floating diffusion FD1 through the diffusion layer 212N. This operation corresponds to an operation in a case where the switch S1 illustrated in FIG. 12 is turned on and the switches S0, S2, and S3 are turned off.

Thus, the electric charge partitioning section 50 selectively stores electric charge generated by the photoelectric converter 51 in the floating diffusions FD0 to FD3.

The driving section 42 (FIG. 2) is configured to drive a plurality of pixels Q in the pixel array 41 on the basis of an instruction from the sensor controller 25. Specifically, the driving section 42 applies the control signal SGU0 to the plurality of control lines GUL0 (FIG. 12), applies the control signal SGU1 to the plurality of control lines GUL1, applies the control signal SGU2 to the plurality of control lines GUL2, and applies the control signal SGU3 to the plurality of control lines GUL3. In addition, the driving section 42 applies the selection control signal SSELA to the plurality of selection control lines SELLA, and applies the selection control signal SSELB to the plurality of selection control lines SELLB. In addition, the driving section 42 applies the reset control signal SRST0 to the plurality of reset control lines RSTL0, applies the reset control signal SRST1 to the plurality of reset control lines RSTL1, applies the reset control signal SRST2 to the plurality of reset control lines RSTL2, and applies the reset control signal SRST3 to the plurality of reset control lines RSTL3. In addition, the driving section 42 generates the voltage VRST.

Here, the photoelectric converter 51 corresponds to a specific example of a "light receiver" in the present disclosure. The electric charge partitioning section 50 corresponds to a specific example of an "electric charge supplying section" in the present disclosure. The diffusion layers 201P and 211P correspond to a specific example of a "plurality of voltage applying sections" in the present disclosure.

Thus, in the measurement device 2, electric charge generated by the photoelectric converter 51 is selectively stored in the plurality of floating diffusions FD0 to FD3 by forming electric charge in the substrate 200P. Even in this case, for example, determining the depth image PIC on the basis of a difference between the digital code CODE1 related to the floating diffusion FD1 and the digital code CODE3 related to the floating diffusion FD3 makes it possible to enhance measurement accuracy similarly to the above-described first embodiment.

As described above, in the present embodiment, electric charge generated by the photoelectric converter is selectively stored in the plurality of floating diffusions by forming electric charge in the substrate, which makes it possible to enhance measurement accuracy similarly to the above-described first embodiment.

3. Third Embodiment

Next, a measurement device 3 according to a third embodiment is described below. In the present embodiment, generation of the depth image PIC and generation of the captured image PIC2 are performed in parallel. It is to be noted that the components substantially the same as those of the measurement device 1 according to the above-described first embodiment are denoted by the same reference numerals, and descriptions thereof are omitted as appropriate.

As illustrated in FIG. 1, the measurement device 3 includes a sensor 60. As illustrated in FIG. 2, the sensor 60 includes a pixel array 61, a driving section 62, and an image processor 64.

FIG. 14 illustrates a configuration example of a pixel R of the pixel array 61. The pixel array 61 includes a plurality of control lines TRGL0, a plurality of control lines TRGL1, a plurality of control lines TRGL2, a plurality of control lines TRGL3, a plurality of selection control lines SELLA, a plurality of selection control lines SELLB, a plurality of reset control lines RSTLA, a plurality of reset control lines RSTLB, the plurality of signal lines SGL0, and the plurality of signal lines SGL1. The reset control lines RSTLA and RSTLB extend in the horizontal direction (the transverse direction in FIGS. 2 and 14). A reset control signal SRSTA is applied to the reset control lines RSTLA by the driving section 62, and a reset control signal SRSTB is applied to the reset control line RSTLB by the driving section 62. Pixels R in one row configures a pixel line L.

The gates of the transistors RST0, RST1, and RST are coupled to the reset control line RSTLA. The gates of the transistors RST2 and RST3 are coupled to the reset control line RSTLB.

The driving section 62 (FIG. 2) is configured to drive a plurality of pixels R in the pixel array 61 on the basis of an instruction from the sensor controller 25. Specifically, the driving section 62 applies the control signal STRG0 to the plurality of control lines TRGL0 (FIG. 14), applies the control signal STRG1 to the plurality of control lines TRGL1, applies the control signal STRG2 to the plurality of control lines TRGL2, and applies the control signal STRG3 to the plurality of control lines TRGL3. In addition, the driving section 62 applies the selection control signal SSELA to the plurality of selection control lines SELLA, and applies the selection control signal SSELB to the plurality of selection control lines SELLB. In addition, the driving section 62 applies the reset control signal SRSTA to the plurality of reset control lines RSTLA, and applies the reset control signal SRSTB to the plurality of reset control lines RSTLB. In addition, the driving section 62 generates voltages VRST and VRSTX.

The image processor 64 is configured to generate the depth image PIC and the captured image PIC2 on the basis of the image signal DATA0.

Here, the readout section 30 and the image processor 64 correspond to specific examples of a "processor" in the present disclosure.

FIGS. 15A, 15B, 15C, 15D, 15E, 15F, and 15G illustrate an example of the exposure operation D1, where FIG. 15A indicates the waveform of the light pulse L1 emitted from the light source 11, FIG. 15B indicates waveforms of the reset control signals SRSTA and SRSTB, FIG. 15C indicates the waveforms of the voltages VFD0 to VFD3 in the floating diffusions FD0 to FD3, FIG. 15D indicates the waveform of the control signal STRG0, FIG. 15E indicates the waveform of the control signal STRG1, FIG. 15F indicates the waveform of the control signal STRG2, and FIG. 15G indicates the waveform of the control signal STRG3.

Similarly to the measurement device 1 according to the above-described first embodiment (FIGS. 7A, 7B, 7C, 7D, 7E, 7F, 7G, 7H, 10A, 10B, 10C, 10D, 10E, 10F, 10G, and 10H), in a period before a timing t71, the driving section 62 turns the voltages of the reset control signals SRSTA and SRSTB to the high level (FIG. 15B). This turns on the transistors RST0 to RST3 and RST of the pixel R, the voltage VRST is supplied to the floating diffusion FD0 to FD3, and the voltage VRSTX is supplied to the cathode of the photodiode PD. Thus, the voltages VFD0 to VFD3 of the floating diffusion FD0 to FD3 are set to the voltage V1 corresponding to the voltage VRST (FIG. 15C).

Next, at the timing t71, the driving section 62 changes the voltages of the reset control signals SRSTA and SRSTB from the high level to the low level (FIG. 15B). This turns off the transistors RST0 to RST3 and RST of a pixel R1. In addition, the light source 11 starts the light emission operation of alternating between emission and non-emission of light at the timing t71 (FIG. 15A). In addition, the driving section 62 starts to selectively and sequentially turn the control signals STRG0 to STRG3 to the high level at the timing t71 (FIGS. 15D, 15E, 15F, and 15G).

Thus, the exposure period TE starts at the timing t71. In the exposure period TE, the photodiode PD generates electric charge on the basis of the background light L0 incident on the measurement device 3, the light pulse L10, and the reflected light pulse L20. The electric charge generated by the photodiode PD is then stored selectively in the floating diffusions FD0 to FD3.

FIGS. 16A, 16B, 16C, 16D, 16E, 16F, 16G, 16H, 16I, 16J, and 16K illustrate an example of an electric charge storing operation in the floating diffusions FD0 to FD3. The electric charge storing operation is similar to the operation in the measurement device 1 according to the above-described first embodiment (FIGS. 8A, 8B, 8C, 8D, 8E, 8F, 8G, 8H, 8I, 8J, 8K, 11A, 11B, 11C, 11D, 11E, 11F, 11G, 11H, 11I, 11J, and 11K).

A difference between the electric charge Q1 and the electric charge Q3 may be represented by the following expression.

$$Q1-Q3=In[90]+Am[90]-Am[90]=In[90]$$

Accordingly, the measurement device 3 is allowed to obtain information about interference fringes on the basis of the pixel value VAL corresponding to the electric charge In[90] in all the pixels R in the pixel array 61 similarly to the measurement device 1 according to the first embodiment.

In addition, a difference between the electric charge Q2 and the electric charge Q3 may be represented by the following expression.

$$Q2-Q3=Re[\varphi]+Am[90]-Am[90]=Re[\varphi]$$

Accordingly, the measurement device 3 is allowed to obtain the captured image PIC2 on the basis of the pixel value VAL2 corresponding to the electric charge Re[φ] in all the pixels R in the pixel array 61.

The pixel R1 repeats the operation from a timings t81 to a timing t87 illustrated in FIGS. 16A, 16B, 16C, 16D, 16E, 16F, 16G, 16H, 16I, 16J, and 16K. Thus, the electric charge Q0 is repeatedly stored in the floating diffusion FD0, the electric charge Q1 is repeatedly stored in the floating diffusion FD1, the electric charge Q2 is repeatedly stored in the floating diffusion FD2, and the electric charge Q3 is repeatedly stored in the floating diffusion FD3. Accordingly, the voltages VFD0 to VFD3 of the floating diffusions FD0 to FD3 are gradually decreased (FIG. 15C).

As illustrated in FIGS. 15A, 15B, 15C, 15D, 15E, 15F, and 15G, the light source 11 then ends the light emission operation at a timing t76 (FIG. 15A). In addition, the driving section 62 sets the control signals STRG0 to STRG3 to the low level at the timing t76. Thus, the exposure period TE ends at the timing t76.

Thereafter, the measurement device 3 then performs the readout operation D2. The readout section 30 reads the pixel signals SIG related to the floating diffusions FD0 to FD3 in the pixel R1 to generate the digital codes CODE0 to CODE3. The readout section 30 supplies the image signal DATA0 including these digital codes CODE0 to CODE3 to the image processor 64.

The image processor 64 generates the depth image PIC and the captured image PIC2 on the basis of the image signal DATA0.

Specifically, the image processor 64 determines a difference (CODE1−CODE3) between the digital code CODE1 and the digital code CODE3 on the basis of four digital codes CODE0 to CODE3 related to each of the plurality of pixels R and included in the image signal DATA0 to determine the pixel value VAL of the pixel R. The pixel values VAL of all the pixel R in the pixel array 61 include information about interference fringes on a light reception surface S of the sensor 60. The image processor 64 performs predetermined calculation processing including, for example, a Fresnel transform on the basis of information about the interference fringes to determine phase information INF. The image processor 64 then generates the depth image PIC on the basis of the phase information INF.

In addition, the image processor 64 determines a difference (CODE2−CODE3) between the digital code CODE2 and the digital code CODE3 on the basis of four digital codes CODE0 to CODE3 related to each of the plurality of pixels R and included in the image signal DATA0 to determine the pixel value VAL2 of the pixel R. The pixel values VAL2 of all the pixel R in the pixel array 61 configure the capture image PIC2. The image processor 64 generates the captured image PIC2 in such a manner.

Here, a period from a timing t83 to a timing t84 corresponds to a specific example of a "second period" in the present disclosure. A period from a timing t86 to the timing t87 corresponds to a specific example of a "third period" in the present disclosure. A period from the timing t84 to the timing t86 corresponds to a specific example of a "fourth period" in the present disclosure.

As described above, in the measurement device 3, on the basis of the four digital codes CODE0 to CODE3 related to each of the plurality of pixels R and included in the image signal DATA0, a difference (CODE1−CODE3) between the digital code CODE1 and the digital code CODE3 is determined to determine the pixel value VAL of the pixel R, and a difference (CODE2−CODE3) between the digital code CODE2 and the digital code CODE3 is determined to determine the pixel value VAL2 of the pixel R. The measurement device 3 then generates the depth image PIC on the basis of the pixel value VAL, and generates the captured image PIC2 on the basis of the pixel value VAL2. This makes it possible to perform generation of the depth image PIC and generation of the captured image PIC2 in parallel in the measurement device 3.

As described above, in the present embodiment, a difference (CODE1−CODE3) between the digital code CODE1 and the digital code CODE3 is determined to determine the pixel value VAL of the pixel, and a difference (CODE2−

CODE3) between the digital code CODE2 and the digital code CODE3 is determined to determine the pixel value VAL2 of the pixel, which makes it possible to perform generation of a depth image and generation of a captured image in parallel. Other effects are similar to those in the above-described first embodiment.

Modification Example

The electric charge partitioning section 50 according to the second embodiment may be applied to the measurement device 3 according to the third embodiment.

Although the present technology has been described above with reference to some embodiments, the present technology is not limited to these embodiments and the like, and may be modified in a variety of ways.

For example, in the respective embodiments described above, four floating diffusions FD0 to FD3 are provided, and electric charge generated by the photodiode PD is selectively stored in the four floating diffusions FD0 to FD3, but this is not limitative. Alternatively, for example, a plurality of, for example, five or more, floating diffusions may be provided, and electric charge generated by the photodiode PD may be selectively stored in these floating diffusions.

It is to be noted that the effects described in this specification are merely illustrative and non-limiting, and other effects may be provided.

It is to be noted that the present technology may have the following configurations.

(1)

A measurement device including:

a pixel including a light receiver, a plurality of storage sections, and an electric charge supplying section, the light receiver configured to generate received-light electric charge by performing photoelectric conversion on the basis of light, the plurality of storage sections configured to store the received-light electric charge and including a first storage section and a second storage section, and the electric charge supplying section configured to selectively supply the received-light electric charge generated by the light receiver to the plurality of storage sections; and a processor configured to generate a first detection value on the basis of an electric charge amount of the received-light electric charge stored in the first storage section, configured to generate a second detection value on the basis of an electric charge amount of the received-light electric charge stored in the second storage section, and configured to generate a first pixel value on the basis of a difference between the first detection value and the second detection value.

(2)

The measurement device according to (1), in which the light receiver is configured to receive light of a light pulse emitted from a light source and light of a reflected light pulse corresponding to the light pulse, the light source being configured to perform a light emission operation of alternating between emission and non-emission of light in a first period, and the electric charge supplying section is configured to selectively supply the received-light electric charge to the plurality of storage sections in synchronization with the light emission operation in the first period.

(3)

The measurement device according to (2), in which the electric charge supplying section is configured to supply the received-light electric charge generated by the light receiver to the first storage section in a second period within a period in which the light source emits light, and is configured to supply the received-light electric charge generated by the light receiver to the second storage section in a third period within a period in which the light source does not emit light.

(4)

The measurement device according to (2) or (3), in which the plurality of storage sections further includes a third storage section, and the processor is configured to generate a third detection value on the basis of an electric charge amount of the received-light electric charge stored in the third storage section, and is configured to generate a second pixel value on the basis of a difference between the second detection value and the third detection value.

(5)

The measurement device according to (4), in which the electric charge supplying section is configured to supply the received-light electric charge generated by the light receiver to the third storage section in a fourth period within a period in which the light source does not emit light.

(6)

The measurement device according to (4) or (5), in which the plurality of storage sections further includes a fourth storage section, and the electric charge supplying section is configured to selectively supply the received-light electric charge generated by the light receiver to the fourth storage section, the first storage section, the third storage section, and the second storage section cyclically in this order in the first period.

(7)

The measurement device according to any one of (2) to (6), in which a plurality of the pixels is provided, the plurality of the pixels is arranged side by side on a light reception surface, interference fringes between a light wave in the light pulse and a light wave in the reflected light pulse are formed on the light reception surface, and the processor is configured to generate the first pixel value on the basis of the electric charge amount of the received-light electric charge stored in the first storage section and the electric charge amount of the received-light electric charge stored in the second storage section in each of the plurality of the pixels, and is configured to generate phase information about a phase difference between a phase of the light wave in the light pulse and a phase of the light wave in the reflected light pulse on the basis of a plurality of the first pixel values.

(8)

The measurement device according to (7), in which the processor is configured to generate a depth image on the basis of the phase information.

(9)

The measurement device according to (7) or (8), further including an optical system that causes the interference fringes to be formed on the light reception surface.

(10)

The measurement device according to any one of (2) to (9), further including the light source.

(11)

The measurement device according to any one of (1) to (10), in which the electric charge supplying section includes a plurality of transistors that is provided corresponding to the plurality of storage sections, and each is configured to supply the received-light electric charge generated by the light receiver to a corresponding one of the storage sections by being turned on.

(12)
The measurement device according to any one of (1) to (11), in which
the electric charge supplying section includes a plurality of voltage applying sections that is provided corresponding to the plurality of storage sections, and each is configured to apply a voltage to a semiconductor substrate where the light receiver is formed, and
the plurality of voltage applying sections is configured to selectively supply the received-light electric charge generated by the light receiver to the plurality of storage sections by forming an electric field on the semiconductor substrate.

This application claims the benefit of Japanese Priority Patent Application JP2018-144862 filed with the Japan Patent Office on Aug. 1, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A measurement device, comprising:
a light source configured to emit a light pulse;
a sensor that includes a light reception surface and a plurality of pixels on the light reception surface, wherein
the plurality of pixels includes a pixel,
the pixel includes a light receiver, a plurality of storage sections, and an electric charge supplying section,
the plurality of storage sections includes a first storage section and a second storage section,
the light receiver is configured to:
receive the emitted light pulse and reflected light pulse of the emitted light pulse, wherein
the emitted light pulse includes a first light wave,
the reflected light pulse includes a second light wave, and
the first light wave and the second light wave form a plurality of interference fringes on the light reception surface;
execute photoelectric conversion based on the received emitted light pulse and the received reflected light pulse; and
generate received-light electric charge based on the execution of the photoelectric conversion,
the electric charge supplying section is configured to selectively supply the generated received-light electric charge to the plurality of storage sections, and
the plurality of storage sections is configured to store the supplied received-light electric charge; and
a processor configured to:
generate a first detection value based on a first electric charge amount of the received-light electric charge stored in the first storage section;
generate a second detection value based on a second electric charge amount of the received-light electric charge stored in the second storage section;
generate a first pixel value based on a difference between the first detection value and the second detection value; and
generate phase information of a phase difference between a phase of the first light wave and a phase of the second light wave based on the first pixel value.

2. The measurement device according to claim 1, wherein
the light source is further configured to perform a light emission operation to alternate between emission of the light pulse and non-emission of the light pulse in a first period, and
the electric charge supplying section is further configured to selectively supply the generated received-light electric charge to the plurality of storage sections in synchronization with the light emission operation in the first period.

3. The measurement device according to claim 2, wherein the electric charge supplying section is further configured to:
supply the generated received-light electric charge to the first storage section in a second period, wherein the second period is within a period in which the light pulse is emitted, and
supply the generated received-light electric charge to the second storage section in a third period, wherein the third period is within a period in which the light pulse is not emitted.

4. The measurement device according to claim 2, wherein
the plurality of storage sections further includes a third storage section configured to store the supplied received-light electric charge, and
the processor is further configured to:
generate a third detection value based on an electric charge amount of the received-light electric charge stored in the third storage section, and
a second pixel value based on a difference between the second detection value and the third detection value.

5. The measurement device according to claim 4, wherein the electric charge supplying section is further configured to supply the generated received-light electric charge to the third storage section in a fourth period, wherein the fourth period is within a period in which the light pulse is not emitted.

6. The measurement device according to claim 4, wherein
the plurality of storage sections further includes a fourth storage section, and
the electric charge supplying section is further configured to selectively supply the generated received-light electric charge to the fourth storage section, the first storage section, the third storage section, and the second storage section cyclically in this order in the first period.

7. The measurement device according to claim 2, wherein the processor is further configured to:
generate a plurality of first pixel values based on the electric charge amount of the received-light electric charge stored in the first storage section in each of the plurality of pixels and the electric charge amount of the received-light electric charge stored in the second storage section in each of the plurality of the pixels, wherein the plurality of first pixel values includes the first pixel value; and
generate the phase information based on the plurality of the first pixel values.

8. The measurement device according to claim 7, wherein the processor is further configured to generate a depth image based on the generated phase information.

9. The measurement device according to claim 7, further comprising an optical system configured to cause formation of the interference fringes on the light reception surface.

10. The measurement device according to claim 1, wherein the
electric charge supplying section includes a plurality of transistors, each transistor of the plurality of transistors corresponds to a respective storage section of the plurality of storage sections, and each transistor of the plurality of transistors is configured to supply the generated received-light electric charge to the respective storage section of the plurality of storage sections.

11. The measurement device according to claim 1, wherein the light receiver is on a semiconductor substrate, the electric charge supplying section includes a plurality of voltage applying sections, each voltage applying section of the plurality of voltage applying sections corresponds to a respective storage section of the plurality of storage sections, and each voltage applying section of the plurality of voltage applying sections is configured to apply a voltage to the semiconductor substrate, and the plurality of voltage applying sections is configured to selectively supply the generated received-light electric charge to the plurality of storage sections based on an electric field on the semiconductor substrate.

* * * * *